United States Patent
Kakuda

(10) Patent No.: US 10,549,280 B2
(45) Date of Patent: Feb. 4, 2020

(54) SAMPLE STORAGE TUBE

(71) Applicant: KOBE BIO ROBOTIX CO, LTD., Kato-shi, Hyogo (JP)

(72) Inventor: Shinichiro Kakuda, Kobe (JP)

(73) Assignee: KOBE BIO ROBOTIX CO, LTD., Hyogo (JP)

( * ) Notice: Subject to any disclaimer, the term of this patent is extended or adjusted under 35 U.S.C. 154(b) by 0 days.

(21) Appl. No.: 15/319,719

(22) PCT Filed: Dec. 10, 2014

(86) PCT No.: PCT/JP2014/082658
§ 371 (c)(1),
(2) Date: Dec. 16, 2016

(87) PCT Pub. No.: WO2016/092645
PCT Pub. Date: Jun. 16, 2016

(65) Prior Publication Data
US 2017/0274375 A1   Sep. 28, 2017

(51) Int. Cl.
*B01L 3/00* (2006.01)
*B29C 45/16* (2006.01)

(52) U.S. Cl.
CPC ...... *B01L 3/50825* (2013.01); *B29C 45/1676* (2013.01); *B01L 3/545* (2013.01);
(Continued)

(58) Field of Classification Search
CPC ......... B01L 3/50825; B01L 2200/0689; B01L 2200/12; B01L 2300/42; B01L 2300/0832;
(Continued)

(56) References Cited

U.S. PATENT DOCUMENTS

| 2004/0074904 A1 | 4/2004 | Share et al. |
| 2007/0102443 A1* | 5/2007 | Chan ...................... A45D 34/06 221/201 |

(Continued)

FOREIGN PATENT DOCUMENTS

| CN | 1134386 | 10/1996 |
| CN | 101790447 | 7/2010 |

(Continued)

OTHER PUBLICATIONS

Extended European Search Report; European Patent Application No. 14908063.2; dated Aug. 29, 2017 (11 pages).

(Continued)

*Primary Examiner* — Jill A Warden
*Assistant Examiner* — Jacqueline Brazin
(74) *Attorney, Agent, or Firm* — Hamre, Schumann, Mueller & Larson, P.C.

(57) ABSTRACT

[Problem to be solved] A sample storage tube having the seal function to the tube body is provided by integral molding and the airtightness is secured in the sample storage tube. [Solution] The sample storage tube 100 comprise a first molded portion 210 and a second molded portion 220 by the integral molding. The first molded portion 210 is molded as the base figure of the tube body. The second molded portion 220 includes at least the opening edge portion which contacts the lid 300 and closes the opening. The first molded portion 210 is molded by the first material such as polypropylene, the second molded portion 220 is molded by the second material such as TPE which is suitable for the seal object to secure the airtightness between the opening and the lid 300. This second molded portion providing the seal function is molded onto the opening edge of the tube body by the integral molding. The second molded portion 220 can (Continued)

be molded as a consecutive object from the bottom portion to the opening edge of the tube body.

6 Claims, 18 Drawing Sheets

(52) U.S. Cl.
CPC ... *B01L 2200/0689* (2013.01); *B01L 2200/12* (2013.01); *B01L 2300/021* (2013.01); *B01L 2300/042* (2013.01); *B01L 2300/0832* (2013.01); *B01L 2300/0848* (2013.01); *B01L 2300/0851* (2013.01); *B01L 2300/0854* (2013.01); *B01L 2300/12* (2013.01); *B01L 2300/123* (2013.01); *B01L 2300/16* (2013.01); *B01L 2300/168* (2013.01)

(58) Field of Classification Search
CPC ..... B01L 2300/0848; B01L 2300/0851; B01L 2300/123; B01L 2300/168
USPC ........................................................ 422/550
See application file for complete search history.

(56) References Cited

U.S. PATENT DOCUMENTS

| | | |
|---|---|---|
| 2007/0243348 A1 | 10/2007 | Yang et al. |
| 2008/0035642 A1 | 2/2008 | Esser et al. |
| 2011/0085951 A1* | 4/2011 | Nakahana .............. B01L 3/5082 422/549 |
| 2012/0211493 A1* | 8/2012 | Daggett .............. B01L 3/50825 220/315 |
| 2013/0306636 A1* | 11/2013 | Wulf .................. B65D 43/0212 220/259.1 |

FOREIGN PATENT DOCUMENTS

| | | | |
|---|---|---|---|
| EP | 1681239 | A1 | 7/2006 |
| EP | 2159031 | A1 | 3/2010 |
| JP | 1988-57255 | U | 4/1988 |
| JP | H05-246457 | A | 9/1993 |
| JP | H08-34467 | A | 2/1996 |
| JP | 08258860 | * | 10/1996 |
| JP | H08-258860 | A | 10/1996 |
| JP | 2000-043873 | | 2/2000 |
| JP | 2006-234077 | A | 9/2006 |
| JP | 2006-273383 | A | 10/2006 |
| JP | 2006273383 | * | 10/2006 |
| JP | 4696186 | B2 | 6/2011 |

OTHER PUBLICATIONS

International Search Report and Written Opinion; International Patent Application No. PCT/JP2014/082658, dated May 19, 2015, with English translation of Search Report (9 pages).

* cited by examiner (a)

(b)

(c)

(a)

(b)

(c)

[A-A line cross sectional view]

[B-B line cross sectional view]

(a) Molding step for forming the first molded portion by the first molding injection (b) The inner mold 510 is pulled out from the outer mold 520

(a)

[Front view]

[Front view]

(b)

[Front view]

[Front view]

Information code is written by laser marking

The outer type sample storage tube described in the prior art JP4696186

(a)

(b)

The inner type sample storage tube described in the prior art JP4696186

SAMPLE STORAGE TUBE

TECHNICAL FIELD

This invention relates to a sample storage tube for storing and containing many samples. For example, the sample storage tube is used in enclosing and storing medicine samples being developed. Also, it is used for storing, refrigerating, freezing and preserving samples that hold gene information of DNA in the medical field.

BACKGROUND ART

Various products are manufactured by an injection molding machine.

In the research and development of medicine and chemicals, sample storage tubes are used extensively in storing a large number of samples. For example, scientists prepare a large number of samples for a comparative experiment with slightly changing conditions such as blending amount, and they use storage tubes for storing the samples for a required period of time while evaluating them. As the sample storage tube, a micro tube is used.

A plurality of micro tubes are independent of each other and these are arrayed in the rack used as a micro tube array set. The micro tube is a sample storage tube whose height is about several centimeters to 10 centimeters and is made of plastic resin. The micro tube can be used single independently and can be used as micro tube array for storing many samples at the same time arrayed in the rack. Recently, the micro tube array set in which plurality of micro tubes are arrayed in the rack becomes popular.

For example, the micro tube type sample storage tube is manufactured by the injection molding machine.

FIG. 17 is a schematic view showing the micro tube type sample storage tube having the outer screw shown in the prior art JP4696186.

As shown in FIG. 17, the sample storage tube 10 is a micro tube with the tube body installed in the outer element (jacket) 12. The sample storage tube 10 comprises a cylinder shape tube body 11 inserted to the outer element 12, an outer element 12, a seal object 13 for enhancing the air tightness and a lid 14 for capping the opening of the tube body. The sample storage tube 10 provides airtightness and writable ability by the outer element 12 and the lid 14 to the cylinder shape tube body 11.

The sample storage tube 10 caps the opening of the tube body 11 by the combination of the outer element 12 and the lid 14. In this example, the sample storage tube is what is called the "outer screw type" in which the outer screw is provided on the upper portion of the outer element 12 while the inner screw is provided on the inner side surface of the lid 14.

If the outer type sample storage tube 10 does not employ the seal object 13 and only the lid 14 contacts to the opening of the tube body 11, the airtightness of the tube body 11 may be deteriorated. Outside air can pass through the fine gap between the opening edge of the tube body 11 and the lid 14 because physical manufacturing errors such as manufacturing error in the tube body opening edge and manufacturing error in the inner surface of the lid 14 exist and cannot be not avoided physically.

This ventilation may affect the preservation state of the sample in the tube body 11. Therefore, the seal object 13 may be employed to secure the airtightness. In this example, the seal object 13 is provided as the independent element located between the opening of the tube body 11 and the lid 14. As the other example, the seal object 13 can be provided as the inner object of the lid 14 by embedding in the inner surface of the lid 14.

The material of the seal object 13 should be an elastic material such as silicone plastic rubber, natural rubber and thermal plastic elastomer. When the seal object 13 located between the opening of the tube body 11 and the inner surface of the lid 14 is pressed and pinched by screwing the outer element 12 and the lid 14, the seal object 13 made of elastic material is deformed by the pressure. When the lid 14 is screwed onto the tube body 11, the deformation of the seal object 13 gets bigger than the manufacturing error in the opening of the tube body 11 and the inner surface of the lid 14. Therefore, the bad effect from the manufacturing error in the opening of the tube body 11 and the inner surface of the lid 14 can be eliminated by the deformation of the seal object 13.

In this example, the outer element 12 is made of plastic resin that can turn its color from black to white by laser irradiation. The sample storage tube 10 is used for a micro tube array set in which a lot of sample storage tubes 10 are arrayed in order to store a lot of samples. Therefore, the micro tube array having a simple cylinder structure is not enough because the sample storage tube 10 should have the required function and structure such as an information writable area on the outer side surface and a lid for enclosing the sample with airtightness. The sample storage tube having a simple cylinder structure in the prior art as shown in FIG. 17 is equipped with an outer element 12 in order to obtain the required function and structure as the sample storage tube 10.

FIG. 18 is a schematic view showing the micro tube type sample storage tube having the inner screw shown in the prior art JP4696186.

As shown in FIG. 18, the sample storage tube 20 comprises a micro tube 21 installed in to the outer element 22, a seal object 23 for enhancing the air tightness and a lid 24 for capping the opening of the tube body the same as that of FIG. 17. The lid 24 of the sample storage tube 20 is screwed into the inner screw installing near around the upper opening. In this example, the sample storage 20 is "the inner screw type", which the inner screw is provided on the inner side surface of the upper opening of the tube body 21, and the outer screw is provided on the outer side surface of the lid 24.

If the inner type sample storage tube 20 does not employ the seal object 23 and only the lid 24 contacts to the opening of the tube body 21 directly, the airtightness of the tube body 21 may be deteriorated. Outer air can pass through the fine gap between the opening edge of the tube body 21 and the lid 24 because physical manufacturing errors such as manufacturing error in the tube body opening edge and manufacturing error in the inner surface of the lid 24 exist and cannot be not avoided physically. The inner screw type as well as the outer type requires the seal object 23 in order to secure the airtightness. In this example, the seal object 23 is provided as the independent element located between the opening of the tube body 21 and the lid 24. As the other example, the seal object 23 can be provided as the inner object of the lid 24 by embedding it into the inner surface of the lid 24.

Prior art 1: JP4696186

DISCLOSURE OF THE INVENTION

The Problems to be Solved

Whether the outer screw type or the inner screw type, the sample storage tube in the prior art faces problems as follows.

Problems are the increase of the manufacturing steps and the increase of the manufacturing cost for installing the seal object embedded to the inner surface of the lid.

As shown above, the seal object is required whether the storage tube is the inner type or the outer type. If the seal object is an insertion type as the independent element between the tube body opening edge and the lid, the seal object is regarded as one element to be combined, and the seal object is inserted between the tube body opening edge and the lid during the manufacturing step of the sample storage tube assembly. This insertion step increases the step for assembling operation by the automation machine. It causes an increase of the manufacturing time and an increase of the manufacturing cost.

If the seal object is embedded into the inner surface of the lid, this embedded step also increases the step for assembling operation, the manufacturing time and the manufacturing cost.

There is no example provided the seal object at the upper opening edge of the tube body. The area in the upper opening edge of the tube body is very small, so the seal object is difficult to stick to the edge from the technological view and it is not preferable to stick the seal object onto the edge with glue from the point view of sample storing. Therefore, the seal object is provided as an independent element. The seal object is assembled and combined during the automation manufacturing process or the seal object is embedded into the inner surface of the lid in advance.

As shown above, the seal object is an essential element in the prior art and the seal object increases the step for assembling operation, the manufacturing time and the manufacturing cost.

It is an object of the present invention to provide a sample storage tube having a seal function to the tube body opening instead of the independent seal object embedded into the inner surface of the lid. Whether the sample storage tube is the outer type or the inner type, the sample storage of the present invention can secure the inner airtightness.

Means for Solving the Problems

In order to achieve the above-mentioned object, the present invention of a sample storage tube for storing a sample in a tube body capped by a lid comprises; a first molded portion and a second molded portion integrally molded by injection molding; wherein the second molded portion is installed in the edge portion of the opening of the tube body; wherein the first molded portion is a base structure of the tube body except for the portion formed as the second molded portion and is made of a first material which is selected for the tube body for storing the sample stably; wherein the second molded portion is made of a second material that has suitable elasticity for sealing between the opening of the tube body and the lid with airtightness; and the portion working as a gasket for sealing the opening of the tube body and lid is formed onto the edge portion of the opening of the tube body by an integral molding for the tube body.

According to the above-mentioned configuration, the second molded portion for providing the seal function to the tube body is installed around the edge of the opening of the tube body by using the integral molding. Therefore, the airtightness between the opening of the tube body and the lid can be obtained whether the sample storage tube employs the outer screw type tube or the inner screw type tube. The sample storage tube of the present invention does not require an independent seal object as required in the prior art anymore. The sample storage tube of the present invention does not require the assemble operation for embedding the seal object into the inner surface of the lid which is required in the prior art anymore.

The seal object is an element installed between the opening of the tube body and the lid for blocking the sample of solid, liquid and the gas stored in the tube body and for enhancing the airtightness to block the ventilation of the outside air. The seal object is called an O-ring or gasket in general.

As the range of the second molded portion, it includes more than one contacting portion for contacting to the lid portion for enclosing the opening of the tube body. Furthermore, the second molded portion covers at least the bottom outer surface wall of the tube body formed as the second molded portion, in addition to the edge portion of the opening of the tube body by an integral molding for the tube body. Furthermore, the second molded portion covers the side outer surface wall of the tube body. In this case, the second molded portion is expanded from the edge portion of the opening of the tube body to the bottom outer surface wall of the tube body by an integral molding for the tube body.

It is preferable that the first material of the first molded portion is a plastic resin having a light transmissive ability; the second material of the second molded portion is a plastic resin having both a light transmissive ability and an information writable ability to be written by an outside writing means; wherein the bottom outer surface wall of the tube body provides an information writable area.

It is also preferable that the first material of the first molded portion is a plastic resin having a light transmissive ability; the second material of the second molded portion is a plastic resin having both a light transmissive ability and an information writable ability to be written by an outside writing means; wherein both the bottom outer surface wall of the tube body and the side outer surface wall of the tube body provide each information writable area respectively.

According to the above-mentioned configuration, the sample storage tube of the present invention allows the stored sample to be observed easily. It is important for the sample storage tube to store the sample without opening. Furthermore, the sample storage tube of the present invention can carry the identification code. It is important for the sample storage tube to be suitable for putting in an array in the rack.

Regarding the thickness of the edge portion of the opening of the tube body, it is preferable that it has a certain range from the upper end face of the opening of the tube body for providing an adequate seal function. In the prior art, there is an annular body element called an O-ring, whose cross-sectional surface is O-shape and a cylinder thin ring called as a circle gasket whose cross-sectional surface is rectangular as the independent element. In the sample storage tube of the present invention, if the thickness of the second molded portion formed on the edge portion of the opening of the tube body has an appropriate thickness, it can provide an adequate seal function for sealing the contact portion between the opening of the tube body and the lid. The thickness of the second molded portion formed on the edge portion of the opening of the tube body can be the same or thicker or thinner than that of the O-ring or the gasket in the prior art. The thickness of the second molded portion formed on the edge portion of the opening of the tube body can be designed depending on the required thickness, which is determined by the conditions such as the diameter, length and the horizontal thickness of the tube body.

The connecting structure between the tube body and the lid is not limited. The connecting structure can be provided to either or both the first molded portion and the second molded portion except for the edge of the opening of the tube body for capping the lid to the tube body. For example, a push lid type, a screw type and fit combination type. The pressure applied to the second molded portion formed on the edge portion of the opening of the tube body should be obtained for deforming its shape to provide the enough seal function.

For example, if the screw type is employed, both the screw length provided on the tube body and the screw length provided on the lid are enough length to obtain the maximum relative shift length between the tube body and the lid for securing enough deformation of the contacting second molded portion formed on the edge portion of the opening of the tube body in order to obtain an adequate seal function.

The sample storage tube of the present invention can provide an idea of a bulge in the second molded portion formed on the edge portion of the opening of the tube body.

It is preferable that if the connecting structure is provided as an outer screw type structure comprising an outer screw installed to the outer side surface wall around the opening of the tube body and an inner screw installed to an inner side surface wall of the lid, the outer side of the second portion of the edge portion on the opening of the tube body has a bulge in the outer direction, because the outer screw type gives pressure to the second portion of the edge portion on the opening of the tube body from the outer to the inner direction in addition to from the upper to the lower direction. Therefore, if the outer side of the second portion of the edge portion on the opening of the tube body has a bulge in the outer direction, it can deform from the contacting outer side to the inner side easily to enhance the seal function.

The same as above, it is also preferable that if the connecting structure is provided as an inner screw type structure comprising an inner screw provided on the inner side surface wall around the opening of the tube body and an outer screw provided on an outer side surface wall of the lid, the inner side of the second portion of the edge portion on the opening of the tube body has a bulge in the inner direction.

Effect of the Invention

According to the sample storage tube of the present invention, the second molded portion for providing the seal function is formed onto the edge of the opening of the tube body by integral molding, and the airtightness can be obtained easily by capping the lid to the tube body, whether the outer screw type or the inner screw type. The operation step for inserting the independent seal object such as gasket in the prior art between the tube body and the lid can be eliminated. In the same manner, the operation step for embedding the independent seal object such as gasket in the prior art into the inner surface of the lid can be eliminated.

BRIEF DESCRIPTION OF THE DRAWINGS

FIG. 2 (*b*) is a schematic view showing the lid 300 (outer screw type) screwing into the opening of the tube body 200 (about to complete).

FIG. 2 (*c*) is a schematic view showing the lid 300 (outer screw type) screwing into the opening of the tube body 200 (completed).

FIG. 3 (*b*) is a schematic view showing the lid 300 (inner screw type) screwing into the opening of the tube body 200 (about to complete).

FIG. 3 (*c*) is a schematic view showing the lid 300 (inner screw type) screwing into the opening of the tube body 200 (completed)

FIG. 4 (*b*) is a schematic view of the outer screw type structure having an outer bulge on the outer side surface of the opening edge portion 220 (by half).

FIG. 4 (*c*) is a schematic view of the outer screw type structure having an outer bulge on the outer side surface of the opening edge portion 220 (completed).

FIG. 5 (*b*) is a schematic view of the (inner screw type) structure having an inner bulge on the inner side surface of the opening edge portion 220 (by half).

FIG. 5 (*c*) is a schematic view of the (inner screw type) structure having an inner bulge on the inner side surface of the opening edge portion 220 (completed).

FIG. 6 (*b*) is a A-A cross-sectional view of the structure of the sample storage tube 100-2 of the second embodiment.

FIG. 6 (*c*) is a B-B cross-sectional view of the structure of the sample storage tube 100-2 of the second embodiment.

FIG. 7 (*b*) is a schematic view showing the information writing operation to the side surface portion 222 and the bottom surface portion 223 of the tube body 200-2 (recorded).

FIG. 8 (*b*) is D-D line cross sectional view and C-C line cross sectional view of the structure of the inner mold 510.

FIG. 9 (*b*) is F-F line cross sectional view and E-E line cross sectional view of the structure of the outer mold 520.

FIG. 10 (*b*) is H-H line cross sectional view and G-G line cross sectional view of the structure of the outer mold 530.

FIG. 11 (*b*) is a cross sectional view showing the first mold pattern combination 501 formed by combining the core mold of the inner mold 510 and the first cavity mold of the outer mold 520.

FIG. 12 (b) is a schematic view showing stripping the mold away from the molded product.

FIG. 13 (b) is a schematic view showing the second mold pattern combination 502 formed by combining the core mold of the inner mold 510 and the second cavity mold of the outer mold 530 (completed).

FIG. 16 (b) is a schematic view showing the molded tube body 200 capped by the lid 300 (recorded).

FIG. 17 (b) is a schematic view of the structure of an outer type micro tube in the prior art (disassembled) shown in the JP4696186.

FIG. 18 (b) is a schematic view of the structure of an inner type micro tube in the prior art (disassembled) shown in the JP4696186.

DETAILED DESCRIPTION OF THE PREFERRED EMBODIMENT

Some embodiments of a sample storage tube and an manufacturing operating of the sample storage tube according to the present invention are described below with reference to the relevant drawing. Needless to add, the claims of the present invention include but are not limited to the application, configuration, or quantity shown in the following embodiments.

Embodiment 1

The sample storage tube 100 in embodiment 1 according to the present invention is described.

Figure 1:
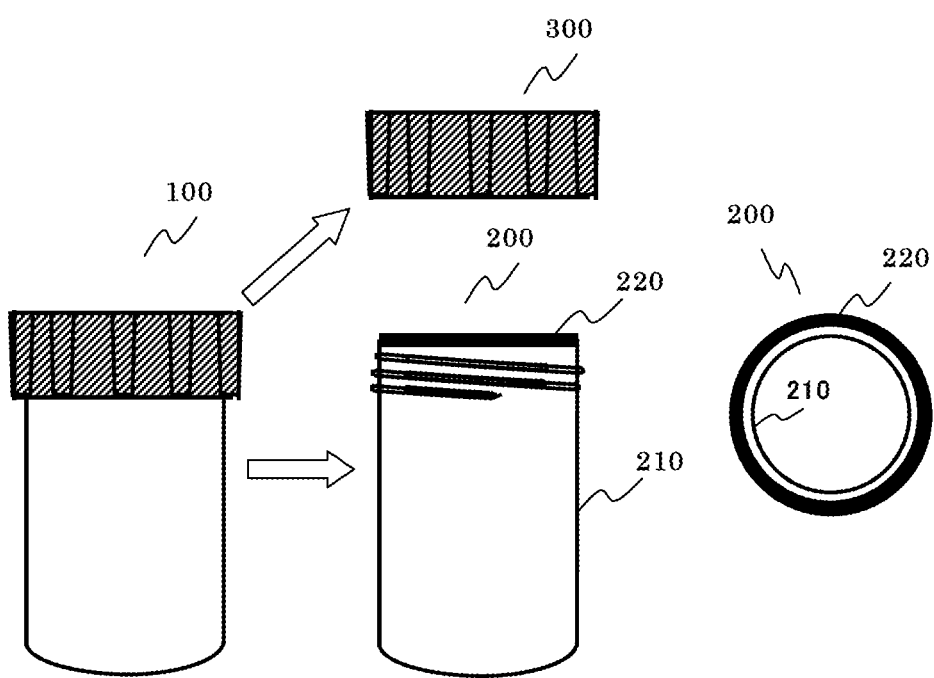
FIG. 1 is a schematic view of the structure of the sample storage tube 100 (outer screw type).

FIG. 1 is a schematic view of the structure of the sample storage tube 100 (outer screw type).

As shown in FIG. 1, the sample storage tube 100 is the molded product having the container shape and comprises the tube body 200 and the lid 300. This is an outer screw type tube.

The tube body 200 is a molded object of which the first molded portion 210 is a base figure and the second molded portion 220 is molded integrally onto the first molded portion 210.

In the molded object shown in FIG. 1, the first molded portion 210 has the container shape and the second molded portion 220 is molded integrally onto the upper opening edge. In FIG. 1, the second molded portion 220 is black in color, so the range of the second molded portion 220 is easy to recognize.

As shown later, the tube body 200 is manufactured by a certain injection molding machine which is called a two-color injection molding machine, a two-cylinder injection molding machine and a double mold injection molding machine. In the first injection molding, the first molded portion 210 is molded with the first plastic resin. After the first injection molding, the second molded portion 220 is molded with the second plastic resin. The tube body 200 is integrally molded by combining the second molded portion 220 to the first molded portion 210.

Each element is described below.

The first molded portion 210 is a base figure of the tube body 200 except for the portion to be molded as the second molded portion 220. The first molded portion 210 is molded with a first plastic resin suitable for the tube body.

The first plastic resin is not limited. In order to make the suitable sample storage tube 100, it is preferable that the first plastic resin has chemical resistance and light transmissive ability. For example, the certain plastic resin such as polypropylene, polyethylene, polyethylene terephthalate and polycarbonate can be employed. Blends of these plastic resins can be employed too. For example, polypropylene is used for the first plastic resin.

In this example, the connection structure is an outer screw type structure. As shown in FIG. 1, the outer screw is provided on the side wall surface of the first molded portion 210 corresponding to the lid 300, while the inner screw is installed to the inner side surface of the lid 300. The molded portion 210 and the lid 300 screw together.

The second molded portion 220 is a molded object formed onto the opening edge of the tube body 200. In this example, it is shown as the opening edge portion 221.

The second molded portion is made of the second plastic resin having elasticity suitable for the seal object for securing the airtightness between the opening of the tube body 200 and the lid 300. As the second plastic resin, the material having the thermoplastic ability and the elasticity ability can be employed. In this example, thermoplastic elastomer (TPE) is used.

The thermoplastic elastomer can be deformed by heat, but unlike rubber, it is not deteriorated by heat. The thermoplastic elastomer has liquidity at high temperature, so it is used as the molding material. TPE is a typical thermoplastic and elastic material, so it is suitable as the elastic material for the seal element.

There are various kind of the thermoplastic elastomer (TPE). For example, TPA (polyamide-based TPE), TPC (polyester-based TPE), TPO (polyolefin-based TPE), TPS (polystyrene-based TPE), TPU (polyurethane-based TPE), TPV (dynamic vulcanization TPE) and TPZ (other type TPE) can be employed. It is preferable that the second plastic resin has a thermoplastic ability the same as the first plastic resin and has an affinity with the first plastic resin and the second plastic resin has elasticity suitable for seal element.

Regarding the light transmissive ability, the second molded portion 220 is molded only to the opening edge portion. Therefore, it does not affect the observation of the stored sample. It may be whether the high light transmissive material, the low light transmissive material or the opaque material.

As shown above, the feature of the first embodiment 1 is that the elastic material portion providing a seal function against the lid is molded onto the opening edge integrally. The second molded portion 220 is formed onto the opening edge and it contacts the lid inner surface for providing the airtightness by capping the lid 300 to the tube body. When the lid 300 caps the opening of the tube body 200, the second molded portion 220 is located as the contacting portion between the tube body 200 and the lid 300. The thickness of the opening edge is a certain thickness that can provide the seal function. For example, the thickness is between 0.1 mm to 3 mm. This is an example. Other ranges can be employed according to the diameter, length and the thickness of the cross-sectional area of the tube body 200.

Figure 2:
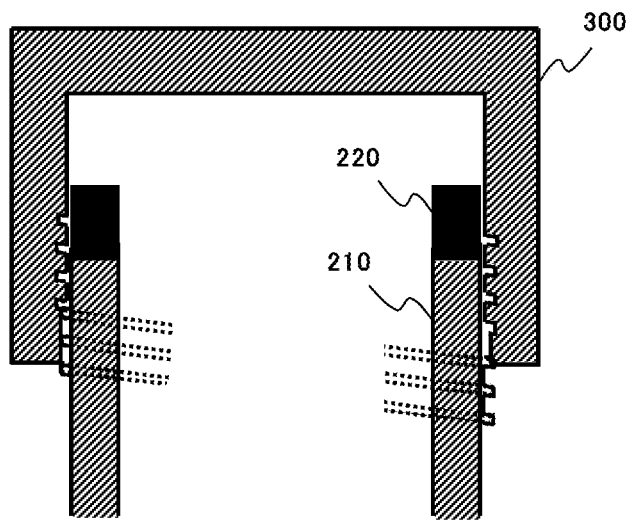
FIG. 2 (*a*) is a schematic view showing the lid 300 (outer screw type) screwing into the opening of the tube body 200 (by half).
Figure 2:
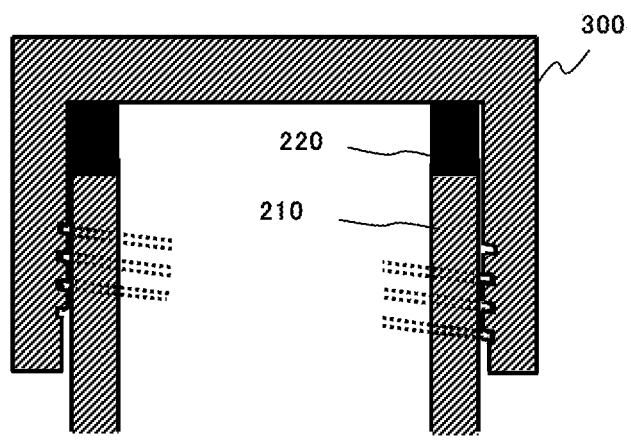
Figure 2:
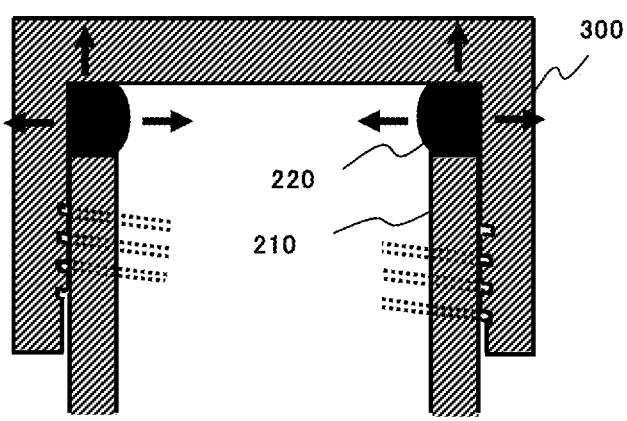

FIG. 2 is a schematic view showing the lid 300 screwing onto the opening of the tube body 200. In order to show the inner structure easily, FIG. 2 (*a*) to FIG. 2 (*c*) are shown by the vertical cross-sectional view respectively.

In this example, the connecting structure is an outer screw type. As shown in FIG. 2 (*a*), the outer screw for connecting the lid 300 is installed around the outer side surface of the first molded portion 210 as the tube body. Also, the inner screw for connecting the tube body is installed around the inner side surface of the lid 300. The tube body and the lid are connected by screwing.

As shown in FIG. 2 (*b*), when the lid 300 is screwed onto the opening of the tube body 200, the inner surface of the lid 300 and the opening edge portion formed on the upper opening end of the tube body 200 contact each other.

Regarding the length of the screw provided on the tube body and the length of the screw provided on the lid, both have a length to obtain the maximum relative shift length between the tube body and the lid for securing the enough deformation of the second molded portion 220 formed on the edge portion of the opening of the tube body in order to obtain enough seal function. If the screw length is not enough, the maximum relative shift length between the tube body and the lid is not enough for deforming the second molded portion 220. In this example, the screw length is enough and the maximum relative shift length is secured.

As shown in FIG. 2 (*c*), as the screwing operation continues, the lid 300 descends lower than FIG. 2 (*b*). The second molded portion 220 on the opening edge that contacts the lid is deformed by the descending pressure. By this deformation of the second molded portion 220 on the opening edge, the influence of the manufacturing error can be reduced. The fine dents and protrusions as the manufacturing error exist in the opening edge of the tube body 200 and inner reverse surface and the inner side surface of the lid 300, and the elastic material of the second molded portion 220 can accept the fine protrusions in the elastic body and the second molded portion 220 can fill or enclose the fine dents by the elastic body. An appropriate seal function between the lid inner reverse surface and the contacted opening edge portion of the tube body 200 can be provided.

The above example is the outer screw type tube, this effect can be obtained in the inner screw type tube case.

Figure 3:
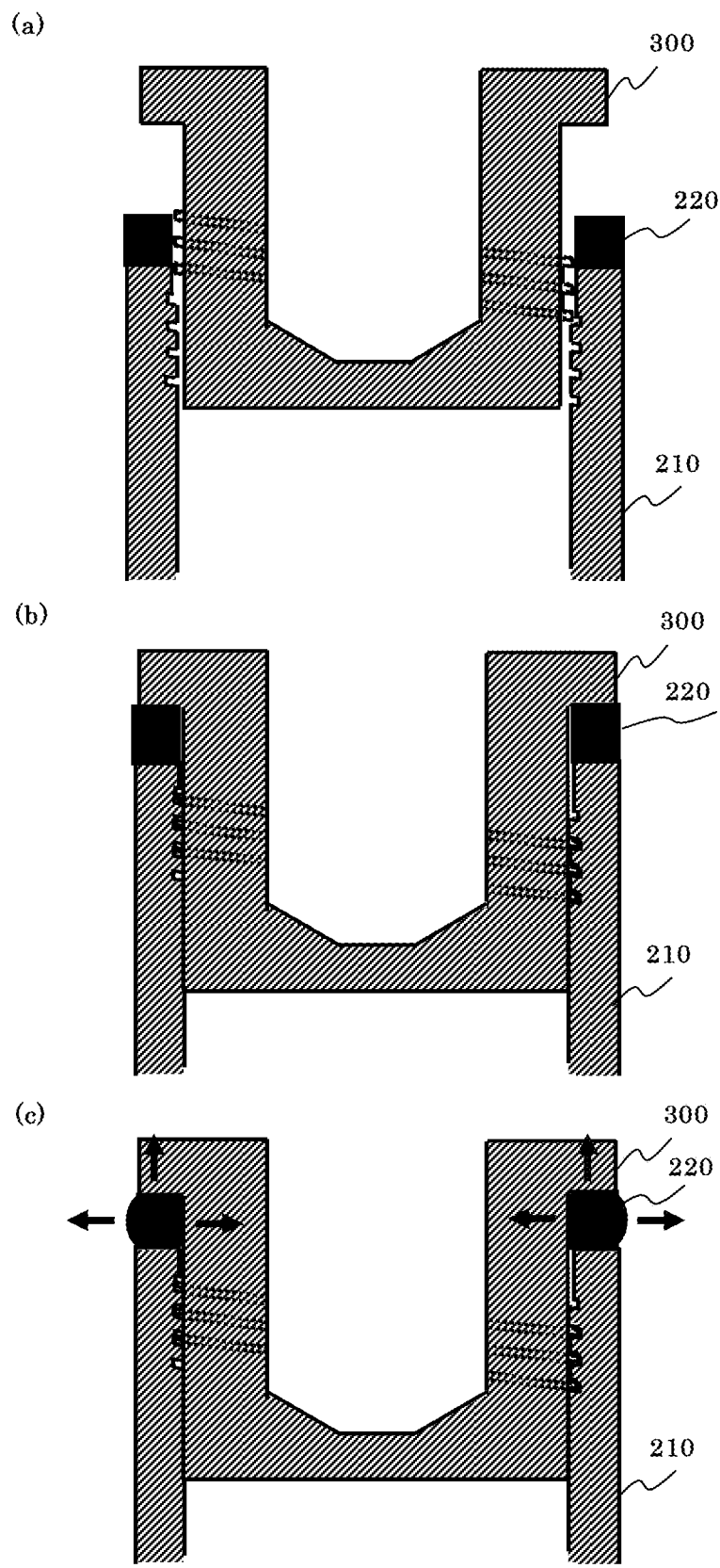
FIG. 3 (*a*) is a schematic view showing the lid 300 (inner screw type) screwing into the opening of the tube body 200 (by half).

FIG. 3 is a schematic view showing the lid 300 screwing into the opening of the tube body 200 in case that the tube is the inner screw type. In order to show the inner structure easily, FIG. 3 (*a*) to FIG. 3 (*c*) are shown by the vertical cross-sectional view respectively.

As shown in FIG. 3, in this example, the connecting structure is an inner screw type.

The same as the outer screw type tube, the length of screw is enough to obtain the maximum relative shift length between the tube body and the lid for securing enough deformation of the second molded portion 220 formed on the edge portion of the opening of the tube body.

As shown in FIG. 3 (*a*), the second molded portion 220 is molded onto the opening edge of the tube body 200. In this example, the inner screw is provided on the inner side surface of the first molded portion 210 that can engage the lid 300. The lid 300 is the cylinder shape having the brim and the outer screw is provided on the outer side surface of the cylinder. Both the inner screw and the outer screw are screwed together.

As shown in FIG. 3 (*b*), when the lid 300 is screwed into the opening of the tube body 200, the inner reverse surface of the lid 300 and the opening edge portion 220 formed onto the upper opening end of the tube body 200 contact each other.

As shown in FIG. 3 (*c*), as the screwing operation continues on, the lid 300 descends lower than FIG. 3 (*b*). The second molded portion 220 on the opening edge that contacts with the inner reverse surface of the lid 300 is deformed by the descend pressure. The same as shown in FIG. 2 (*c*), the appropriate seal function between the lid inner reverse surface and the contacted opening edge portion of the tube body 200 can be provided.

Next, the advanced structure for improving the seal function is described. This advanced structure is not an indispensable element, but it can improve the seal function between the tube body 200 structure and the lid 300 structure.

The first advanced structure is that the outer side of the second molded portion of the opening edge of the tube body has an outer bulge in the outer direction if the sample storage tube is an outer screw type tube having the outer screw provided around the outer side surface of the opening edge of the tube body 200 and the inner screw provided around the inner side surface of the lid 300.

Figure 4:
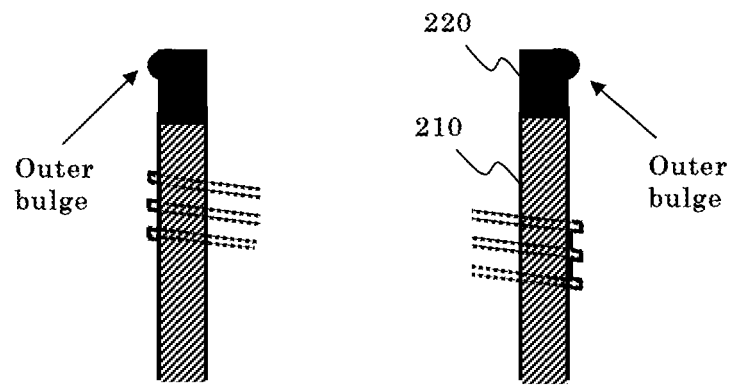
FIG. 4 (*a*) is a schematic view of the outer screw type structure having an outer bulge on the outer side surface of the opening edge portion 220 (no cap).
Figure 4:
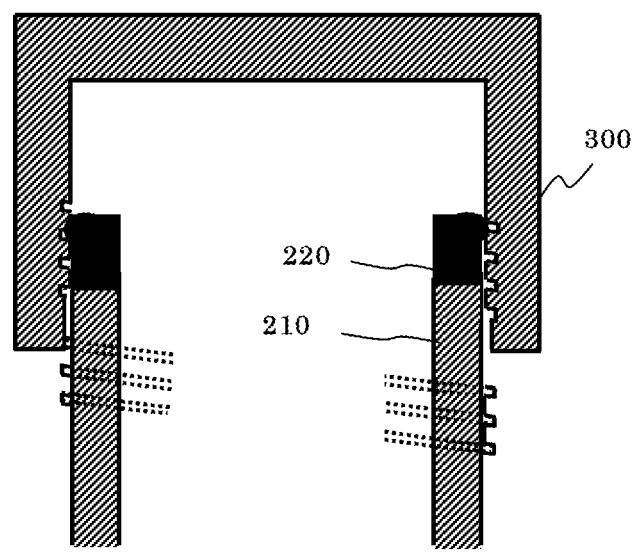
Figure 4:
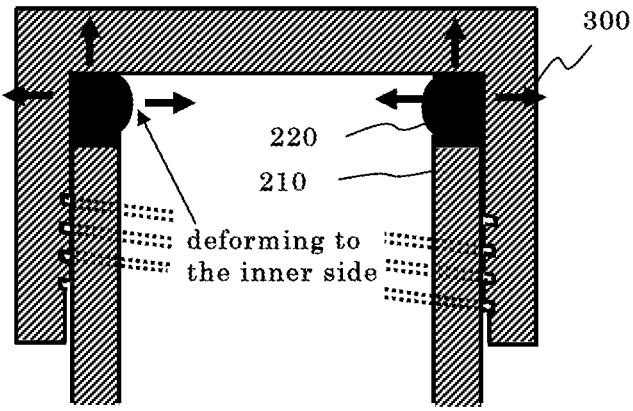

FIG. 4 is a schematic view of the structure having an outer bulge on the outer side surface of the opening edge portion 220 when the tube is the outer screw type. In order to show the inner structure easily, FIG. 4 (*a*) to FIG. 4 (*c*) are shown by the vertical cross-sectional view respectively.

As shown in FIG. 4 (*a*), in this example, the second molded portion 220 is molded onto the opening edge of the tube body 200 the same as FIG. 2 (*a*). In this example, the outer screw is provided on the outer side surface of the first molded portion 210 that can engage the lid 300 while the inner screw is provided on the inner side surface of the lid 300. Both the outer screw and the inner screw are screwed together.

As shown in FIG. 4 (*a*), the outer side of the second molded portion of the opening edge of the tube body has an outer bulge in the outer direction. This outer bulge provides the same effect as the annular shape O-ring which cross-sectional shape is circle having the outer bulge in the outer direction.

As shown in FIG. 4 (*b*) and FIG. 4 (*c*), as the screwing operation continues, the lid 300 descends and the second molded portion 220 on the opening edge that contacts with the lid is deformed in the vertical direction by the descending pressure. The outer size of the second molded portion 220 is slightly bigger than that of the inner side of the lid 300 because the second molded portion 220 has the outer bulge on the outer side surface in the outer direction. The outer bulge is pressed from the outer direction to the inner direction by the inner side wall, and the second molded portion 220 is deformed horizontally to the inner direction by the pressing. The seal function is enhanced in the horizontal direction in addition to the vertical direction.

The second advanced structure is that the inner side of the second molded portion of the opening edge of the tube body has an inner bulge in the inner direction wherein the sample storage tube is an inner screw type tube having the inner screw installed to the inner side surface of the opening edge of the tube body 200 and the outer screw installed around the outer side surface of the lid 300.

Figure 5:
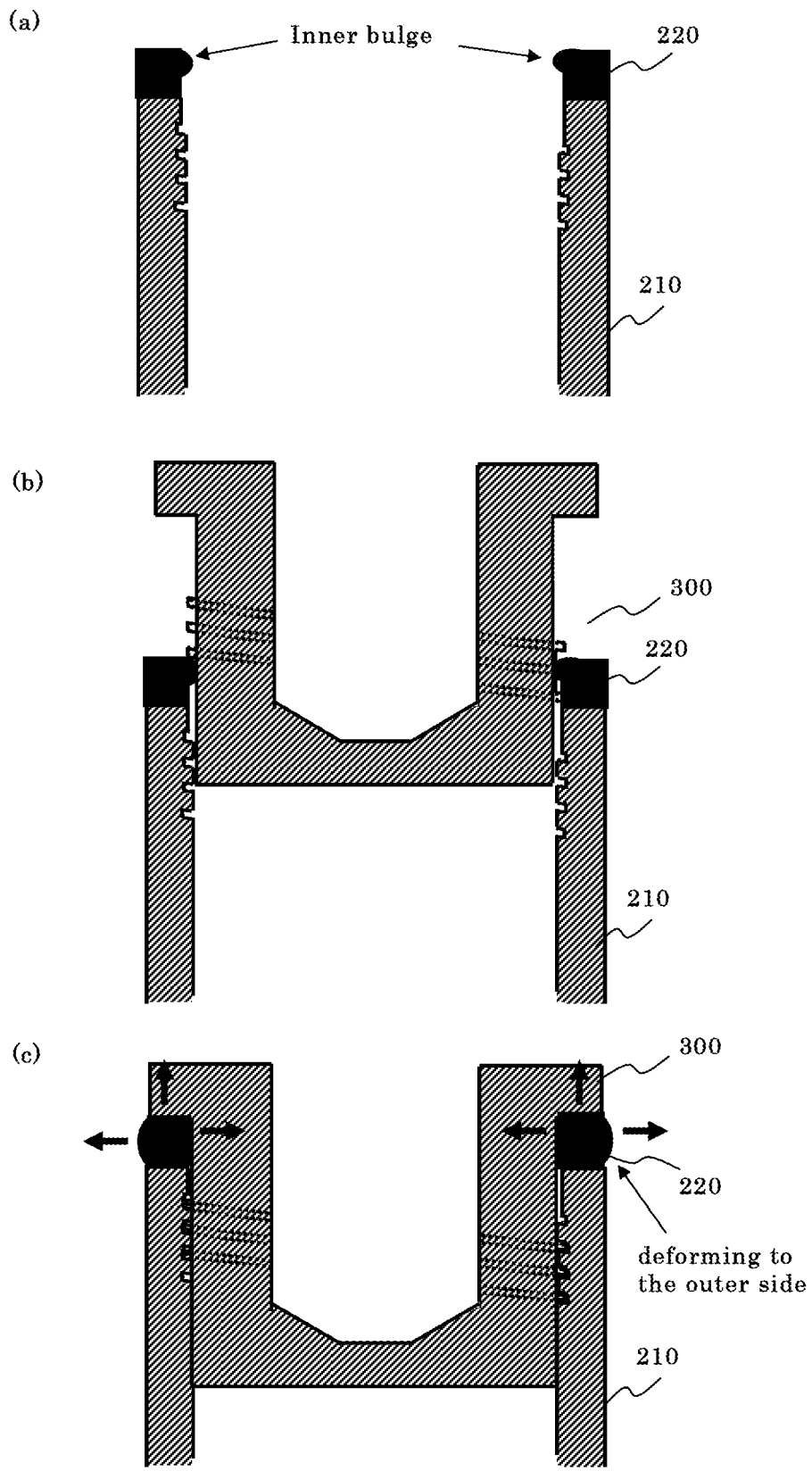
FIG. 5 (*a*) is a schematic view of the (inner screw type) structure having an inner bulge on the inner side surface of the opening edge portion 220 (no cap).

FIG. 5 is a schematic view of the structure having an inner bulge on the inner side surface of the opening edge portion 220 in case that the tube is the inner screw type. In order to show the inner structure easily, FIG. 5 (a) to FIG. 5 (c) are shown by the vertical cross-sectional view respectively.

As shown in FIG. 5 (a), in this example, the second molded portion 220 is molded onto the opening edge of the tube body 200. In this example, the inner screw is installed to the inner side surface of the first molded portion 210 which can screw with the lid 300 while the outer screw is installed to the outer side surface of the lid 300. Both the inner screw and the outer screw are screwed together.

As shown in FIG. 5 (a), the inner side of the second molded portion 220 of the opening edge of the tube body 200 has an inner bulge in the inner direction. This inner bulge provides the same effect as the annular shape O-ring whose cross-sectional shape is a circle having the inner bulge in the inner direction.

As shown in FIG. 5 (b) and FIG. 5 (c), as the screwing operation continues, the lid 300 descends and the second molded portion 220 on the opening edge which contacts with lid is deformed vertical direction by the descending pressure. The inner size of the second molded portion 220 is slightly bigger than that of the outer side of the lid 300 because the second molded portion 220 has the inner bulge on the inner side surface in the inner direction. The inner bulge is pressed from the inner direction to the outer direction by the outer side wall, and the second molded portion 220 is deformed horizontally in the outer direction by the pressing. The seal function is enhanced in the horizontal direction in addition to the vertical direction.

According to the sample storage tube 100 of the first embodiment 1, the second molded portion for providing the seal function to the tube body is installed around the opening edge of the tube body by using the integral molding. Therefore, the airtightness between the opening of the tube body and the lid can be obtained whether the sample storage tube employs the outer screw type tube or the inner screw type tube. The sample storage tube of the present invention does not require an independent seal object as required in the prior art anymore. The sample storage tube of the present invention does not require the assembling operation for embedding the seal object into the inner surface of the lid as required in the prior art anymore.

Embodiment 2

The sample storage tube in embodiment 2 according to the present invention is described. The sample storage tube in embodiment 2 employs the second molded portion that covers at least from the bottom outer surface wall of the tube body via a part of the side surface of the tube body up to the opening edge portion of the tube body as a continuous object by an integral molding. In this embodiment 2, the second molded portion is molded from the bottom surface up to the opening edge of the tube body as a continuous object provides both the seal function and the information code writable function to the bottom surface and the side surface of the tube body.

Figure 6:
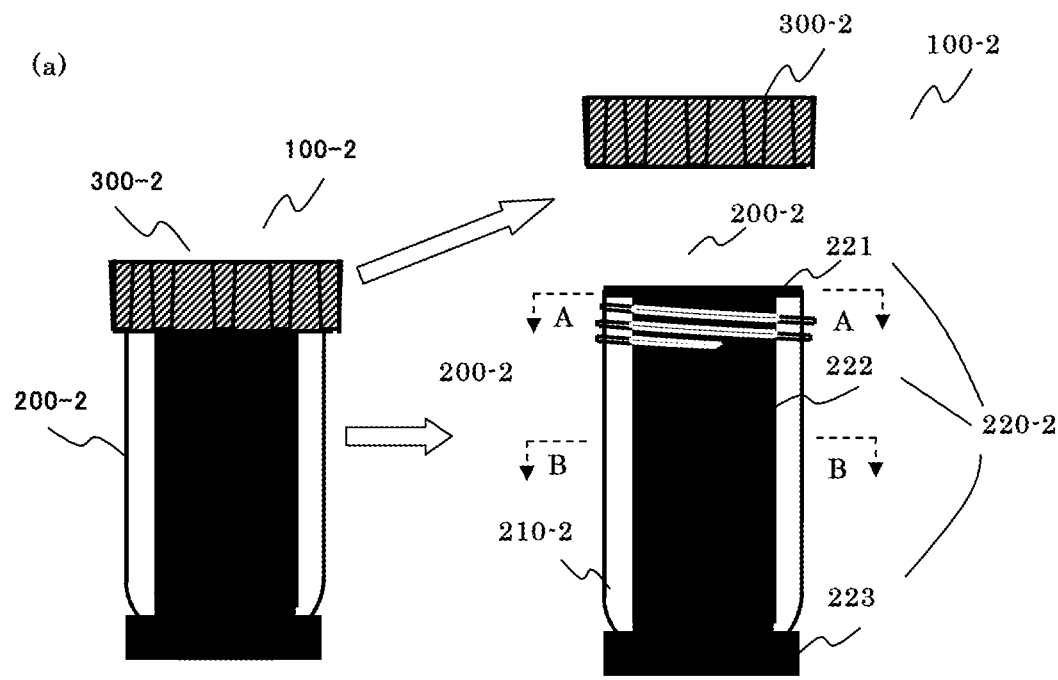
FIG. 6 (*a*) is a schematic view of the structure of the sample storage tube 100-2 of the second embodiment.
Figure 6:
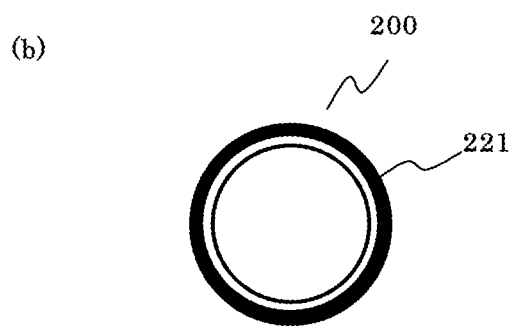
Figure 6:
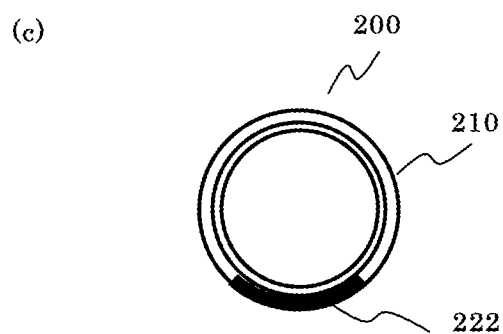

FIG. 6 is a schematic view of the structure of the sample storage tube 100-2 of the embodiment 2.

As shown in FIG. 6, the sample storage tube 100-2 is the molded product having the container shape and comprises the tube body 200-2 and the lid 300-2.

The tube body 200-2 is a molded object in which the first molded portion 210-2 is a base figure and the second molded portion 220-2 is molded integrally onto the first molded portion 210-2. In the molded object shown in FIG. 6, the first molded portion 210-2 has the container shape and the second molded portion 220-2 is molded integrally onto the upper opening edge. In FIG. 6, the second molded portion 220-2 is black in color, so the range of the second molded portion 220-2 is easy to recognize.

As shown later, the tube body 200-2 is manufactured by what is called two-color injection molding operation, which employs two stages of the injection molding operations. In the first injection molding, the first molded portion 210-2 is molded with the first plastic resin. After the first injection molding, the second molded portion 220-2 is molded with the second plastic resin. The tube body 200-2 is integrally molded by combining the second molded portion 220-2 with the first molded portion 210-2.

Each element is described below.

The same as the embodiment 1, the first molded portion 210-2 is a base figure of the tube body 200-2 except for the portion to be molded as the second molded portion 220-2. The first molded portion 210-2 is molded with the first plastic resin suitable for the tube body.

The first plastic resin is not limited. The same as the embodiment 1, polypropylene that has high transmissive ability and chemical resistance is used for the first plastic resin.

The second molded portion 220-2 is a molded object molded from the bottom via side surface up to the opening edge of the tube body 200-2 as a continuous object. In this example, it is shown as the opening edge portion 221, the side surface portion 222 and the bottom portion 223.

The same as embodiment 1, the second molded portion is made of the second plastic resin having the elasticity suitable for the seal object for securing the airtightness between the opening of the tube body 200-2 and the lid 300-2. The same as embodiment 1, as the second plastic resin, the material having the thermoplastic ability and the elasticity ability can be employed. In this example, thermoplastic elastomer (TPE) is used.

In this example, the opening edge portion 221 is molded onto the opening edge of the tube body 200-2 as a part of the second molded portion 220-2, and the opening edge portion 221 provides a seal function with the lid 300-2.

The same as embodiment 1, the opening edge portion 221 is formed onto the opening edge and it contacts to the lid inner reverse surface by screwing the lid 300-2 onto the opening edge of the tube body 200-2. The opening edge portion 221 is located at the contacting portion between the tube body 200-2 and the lid 300-2. The thickness of the opening edge portion 221 has a certain thickness that can provide the seal function.

As shown in A-A line cross-sectional view in FIG. 6 (b), the opening edge portion 221 of the second molded portion 220-2 is molded around the opening edge.

The seal function provided by the opening edge portion 221 is the same as shown in embodiment 1 with reference to FIG. 2 to FIG. 5. The description is omitted here.

Next, the side surface portion 222 and the bottom portion 223 is described below.

As shown in FIG. 6 (a), the second molded portion 220-2 is molded with the second plastic material as a continuous one body.

As shown in FIG. 6 (a), the second molded portion 220-2 is molded from the side surface portion 222 to bottom surface portion 223 as a continuous one body. Regarding the cross-sectional area of the side surface portion 222 of the second molded portion 220-2, the side surface portion 222 occupies the circular-arc portion extending into the part of the first molded portion 210.

The second molded portion 220-2 is molded from the opening edge to the bottom as a continuous object, so the second molded portion 220-2 can be molded by injecting the second material from one gate at one time.

Regarding the injected material, the side surface portion 222 and the bottom surface portion 223 are molded with the same second material as that of the opening edge 221.

In this configuration, the second material is a plastic resin having both a light transmissive ability and an information writable ability written by an outside writing means. For example, it is preferable that the base color of the second material is black and turns white by laser marking. For example, the second material can be adjusted by adding the white turn-able black coloring material into the thermoplastic elastomer.

In order to turn its color from black to white by laser marking, the additive has photosensitivity and heat sensitivity to the laser wavelength range. In short, the additive has photosensitivity and heat sensitivity by changing its physical state and the chemical state upon treatment with the laser. The additive in the prior art having such photosensitivity and heat sensitivity can be employed.

The side surface portion 222 and the bottom surface portion 223 of the second molded portion 220-2 can be used for the information writable medium molded with this second material. The second molded portion 220-2 is provided as the area for information writable area.

The information to be written is not limited. Bar-code information, two-dimensional dot code information, numeric information, word information such as alphabet, signal can be employed according to the application.

Figure 7:
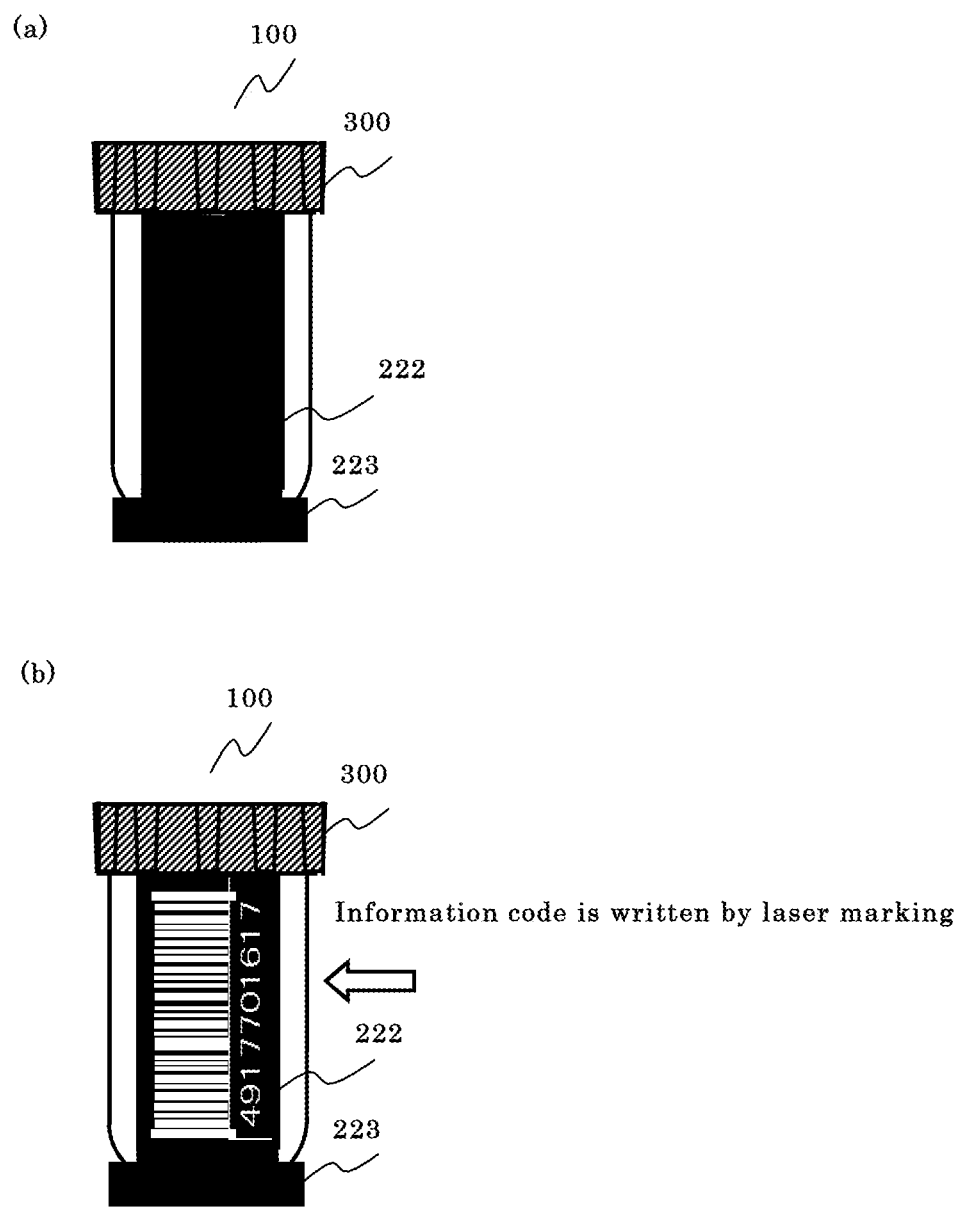
FIG. 7 (*a*) is a schematic view showing the information writing operation to the side surface portion 222 and the bottom surface portion 223 of the tube body 200-2 (blank).

FIG. 7 is a schematic view showing the information writing operation to the side surface portion 222 and the bottom surface portion 223 of the tube body 200-2.

In this example, bar code information is written in the side surface portion 222 and two-dimensional dot code information is written in the bottom surface portion 223.

As shown in FIG. 7 (*a*), both the side surface portion 222 and the bottom surface portion 223 are blank and the whole area is black. As shown in FIG. 7 (*b*), bar code information can be written in the side surface portion 222 and two-dimensional dot code information can be written in the bottom surface portion 223 by coloring the additive from black to white by the laser irradiation.

By this way, information is written in the side surface portion 222 and the bottom surface portion 223, the sample storage tube 100-2 can be identified and managed each by each.

The sample storage tube of the embodiment 2 can utilize the side surface portion and the bottom surface portion as information writable area by covering from the opening edge portion 221 via side surface portion 222 to the bottom surface portion 223 as a continuous object made of the second molded portion which has elasticity and writable ability molded onto the first molded portion 210. If the second material is selected from the material including additive that can turn its color by laser marking, the information required for management can be written onto the side surface and the bottom surface of the tube body by laser marking. The identification information is very useful for the sample storage tube because a lot of sample storage tubes are stored in an array in a rack.

Embodiment 3

Embodiment 3 describes the manufacturing process of the sample storage tube of the present invention.

The sample storage tube 100 are manufactured by the steps in which the first molded portion 210 is manufactured by the first injection molding and the second molded portion 220 is manufactured by the second injection molding onto the first molded portion 210 as the continuous double mold process.

The manufacturing process of the sample storage tube of the present invention is described step by step in the following (A), (B), (C) description.

First, in (A) [The example of the mold pattern using in the manufacturing for the sample storage tube of the present invention], the inner mold pattern 510 as a core, the outer mold pattern 520 as a first outer cavity and the outer mold pattern 530 as a second outer cavity are described.

Next, in (B) [The first mold injection process using the first mold pattern combination 501 which is a combination of the inner mold pattern 510 as a core and the outer mold pattern 520 as a first outer cavity] is described. The first molded portion 610 which is tube body having the opening is described as an example of the molded object by this first mold injection.

Next, in (C) [The second mold injection process using the second mold pattern combination 502 which is a combination of the inner mold pattern 510 as a core and the outer mold pattern 530 as a second outer cavity] is described. The second molded portion 620 covers from the bottom to the side surface of the first molded portion 610 and is molded integrally by thermal fusion with first molded portion 610 as one body.

(A) [The example of the mold pattern using in the manufacturing for the sample storage tube of the present invention]

Three mold pattern are shown as the example of the mold patterns used in this manufacturing process for the sample storage of the present invention.

The inner mold pattern 510 as a core, the outer mold pattern 520 as a first outer cavity and the outer mold pattern 530 as a second outer cavity are described respectively.

Figure 8:
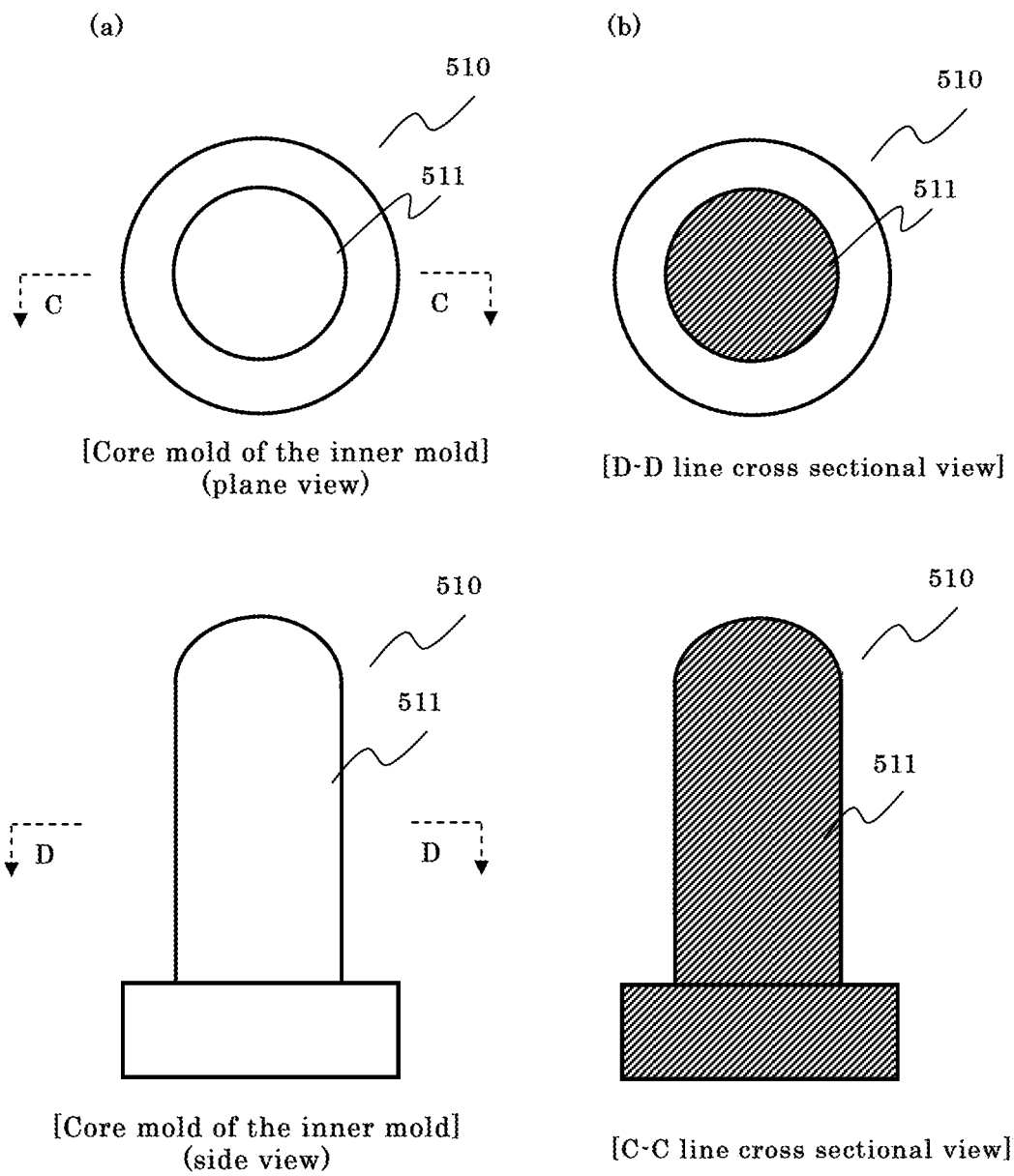
FIG. 8 (*a*) is a schematic view of the structure of the inner mold 510 used as a core mold.

FIG. 8 is a schematic view of the structure of the inner mold pattern 510 used as a core mold. The inner mold pattern 510 is commonly used in the first mold pattern combination 501 and the second mold pattern combination 502.

Figure 9:
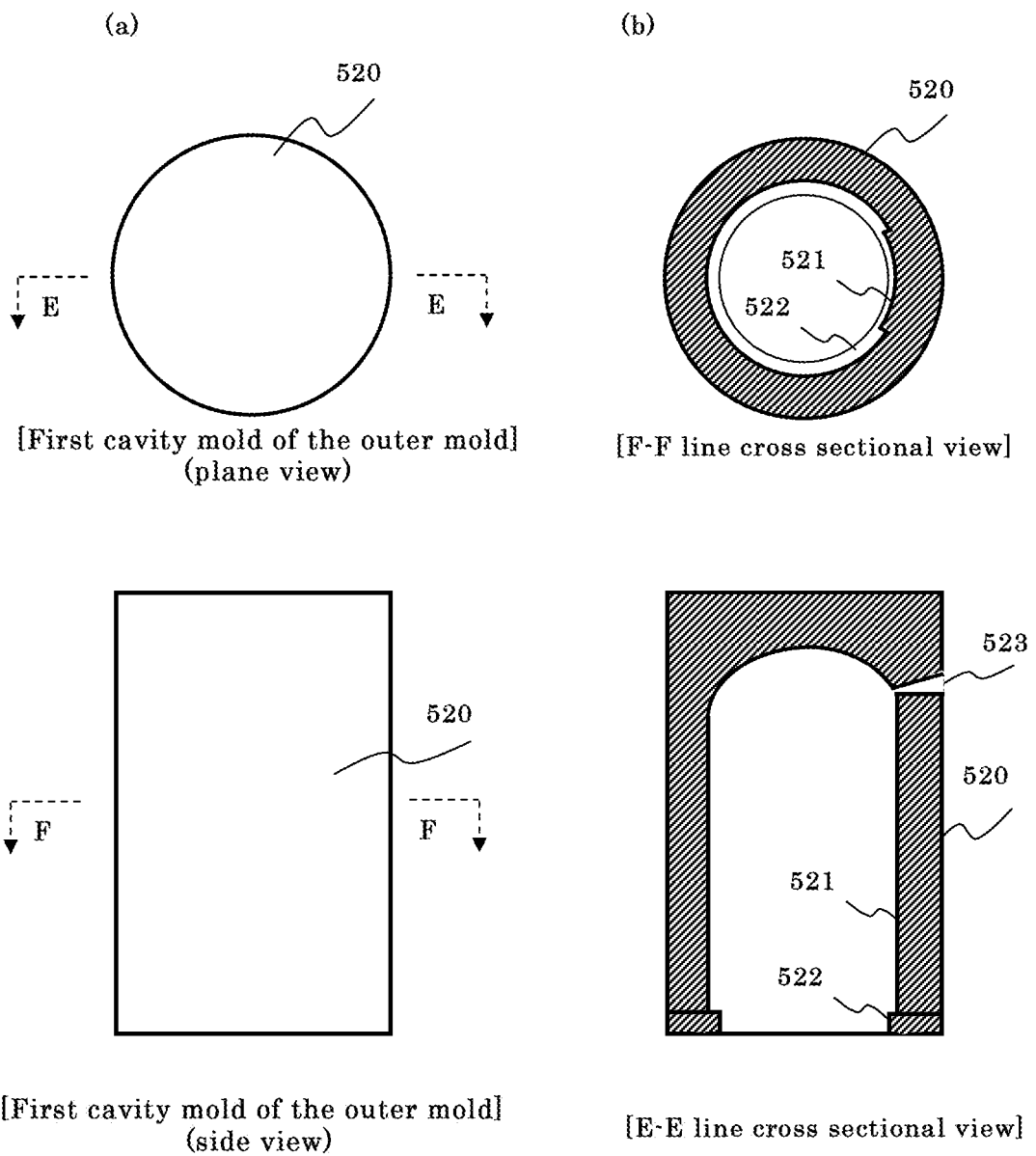
FIG. 9 (*a*) is a schematic view of the structure of the outer mold 520 used as a first cavity mold.

FIG. 9 is a schematic view of the structure of the outer mold pattern 520 used as a first cavity mold. The outer mold pattern 520 is used in the first mold pattern combination 501.

Figure 10:
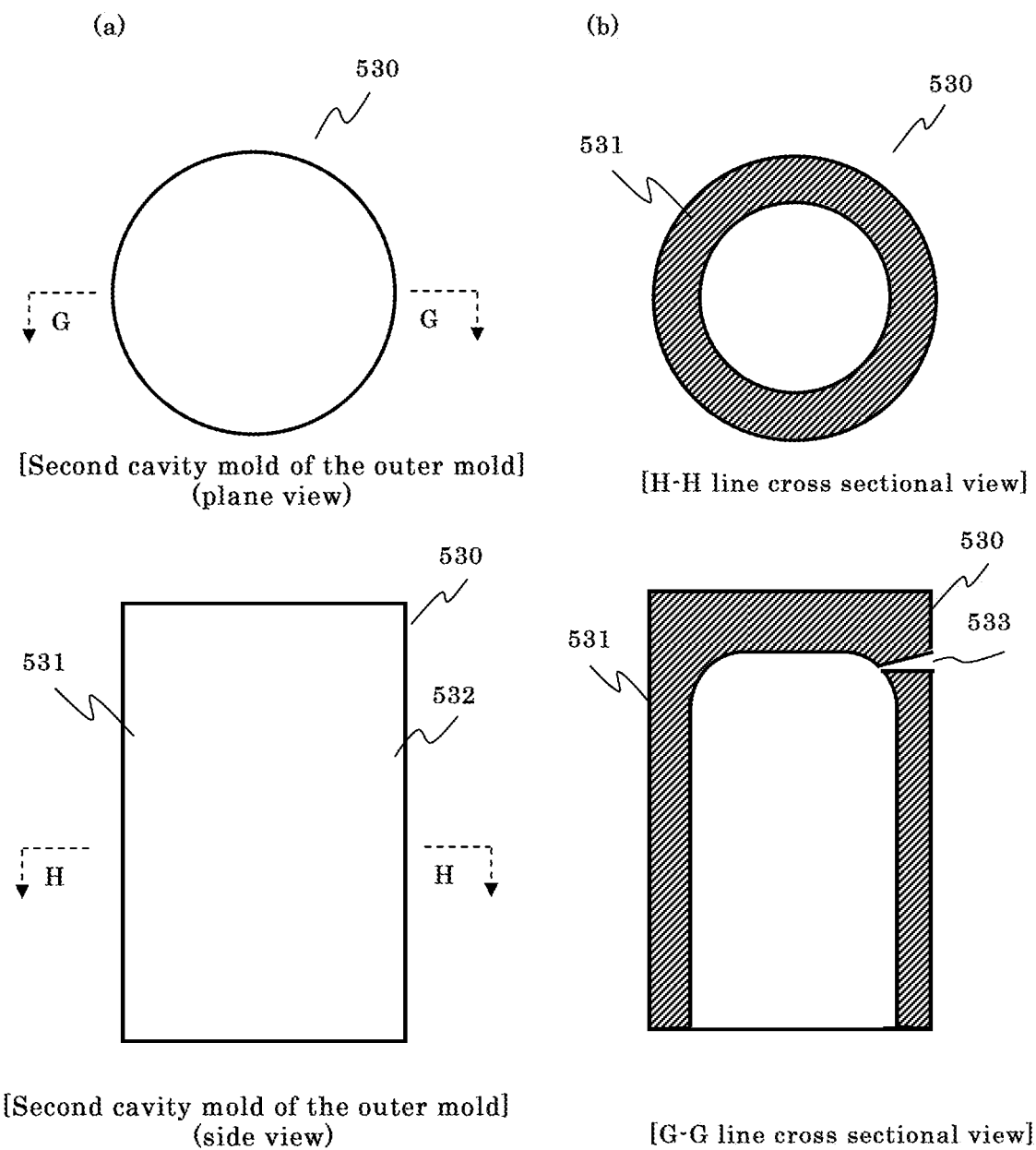
FIG. 10 (*a*) is a schematic view of the structure of the outer mold 530 used as a second cavity mold.

FIG. 10 is a schematic view of the structure of the outer mold pattern 530 used as a second cavity mold. The outer mold pattern 530 is used in the second mold pattern combination 502.

The inner mold pattern 510 as a core mold is described as follows.

The upper figure of FIG. 8 (*a*) is a front view of the inner mold pattern 510 as a core mold, the lower figure of FIG. 8 (*b*) is a side view of the inner mold pattern 510 as a core mold. The upper figure of FIG. 8 (*b*) is a D-D line horizontal cross sectional view of the inner mold pattern 510 as a core mold, the lower figure of FIG. 8 (*b*) is a C-C line vertical cross sectional view of the inner mold pattern 510 as a core mold.

The inner mold pattern 510 works as a core mold having the corresponding inner shape of the molded portion. The inner mold pattern 510 is set in a standing state whose posture is upside down of the container posture.

The inner mold pattern 510 is commonly used in the first mold pattern combination 501 and the second mold pattern combination 502.

The inner mold pattern 510 is set in the outer mold 520 in the first mold pattern combination 501 and in the outer mold 530 in the second mold pattern combination 502.

Next, the outer mold pattern 520 used as a first cavity mold is described below.

The upper figure of FIG. 9 (a) is a front view of the outer mold pattern 520 as a first cavity mold, the lower figure of FIG. 9 (b) is a side view of the outer mold pattern 520 as a first cavity mold. The upper figure of FIG. 9 (b) is a F-F line horizontal cross sectional view of the outer mold pattern 520 as a first cavity mold, the lower figure of FIG. 9 (b) is a E-E line vertical cross sectional view of the outer mold pattern 520 as a first cavity mold.

The outer mold pattern 520 is a cylinder shape mold pattern corresponding to the certain part of the outer figure of the molded portion. The example shown in FIG. 9, outline shape is a cylinder shape.

As shown in FIG. 9 (b) F-F line cross sectional view and E-E line cross sectional view, and the outer mold pattern 520 includes a protrusion portion 521 in an inner surface of the cylinder shape. Therefore, the injection space is narrowed by this protrusion portion 521 shape. This space occupied by the protrusion portion 521 becomes an injection space for the second molded portion 220 in the second mold injection as shown later.

As shown in FIG. 9 (b) F-F line cross sectional view and the E-E line cross sectional view, the outer mold pattern 520 includes a slide mold pattern 522 in the inner surface near the opening of the cylinder shape. This slide mold pattern 522 protrudes inward, and the injection space is narrowed by this slide mold pattern 522 shape. The opening edge portion 221 is molded as a part of the second molded portion 220 in the second mold injection as shown later. This slide mold pattern 522 can slide to the outer direction when strip the outer mold pattern 520.

The outer mold pattern 520 comprises a body part and a gate 523 as an input gate for injecting the first material.

Next, the outer mold pattern 530 used as a second cavity mold is described below.

The outer mold pattern 530 as a second cavity is a cylinder shape mold pattern corresponding to the outer configuration of the product. In the example shown here, the outer mold pattern 530 as a second cavity comprises a body part and a gate 533 as an input gate for injecting the second material.

When combining the second mold pattern combination 502, the space between the outer mold pattern 530 as a second cavity and the molded portion around the inner mold pattern 510 molded by using the first mold pattern combination 501 becomes the mold injection space. In short, the difference in shape between the outer mold pattern 520 as a first cavity and the outer mold pattern 530 as a second cavity is the secondary injection space. The second molded portion is manufactured by molding this injection space.

Each mold pattern is understood by the above description.

(B) [The first mold injection process using the first mold pattern combination 501 which is a combination of the inner mold pattern 510 as a core and the outer mold pattern 520 as a first outer cavity]

The mold injection process using the first mold pattern combination 501 which is the combination of the inner mold pattern 510 as the core and the outer mold pattern 520 as the first cavity is described.

Figure 11:
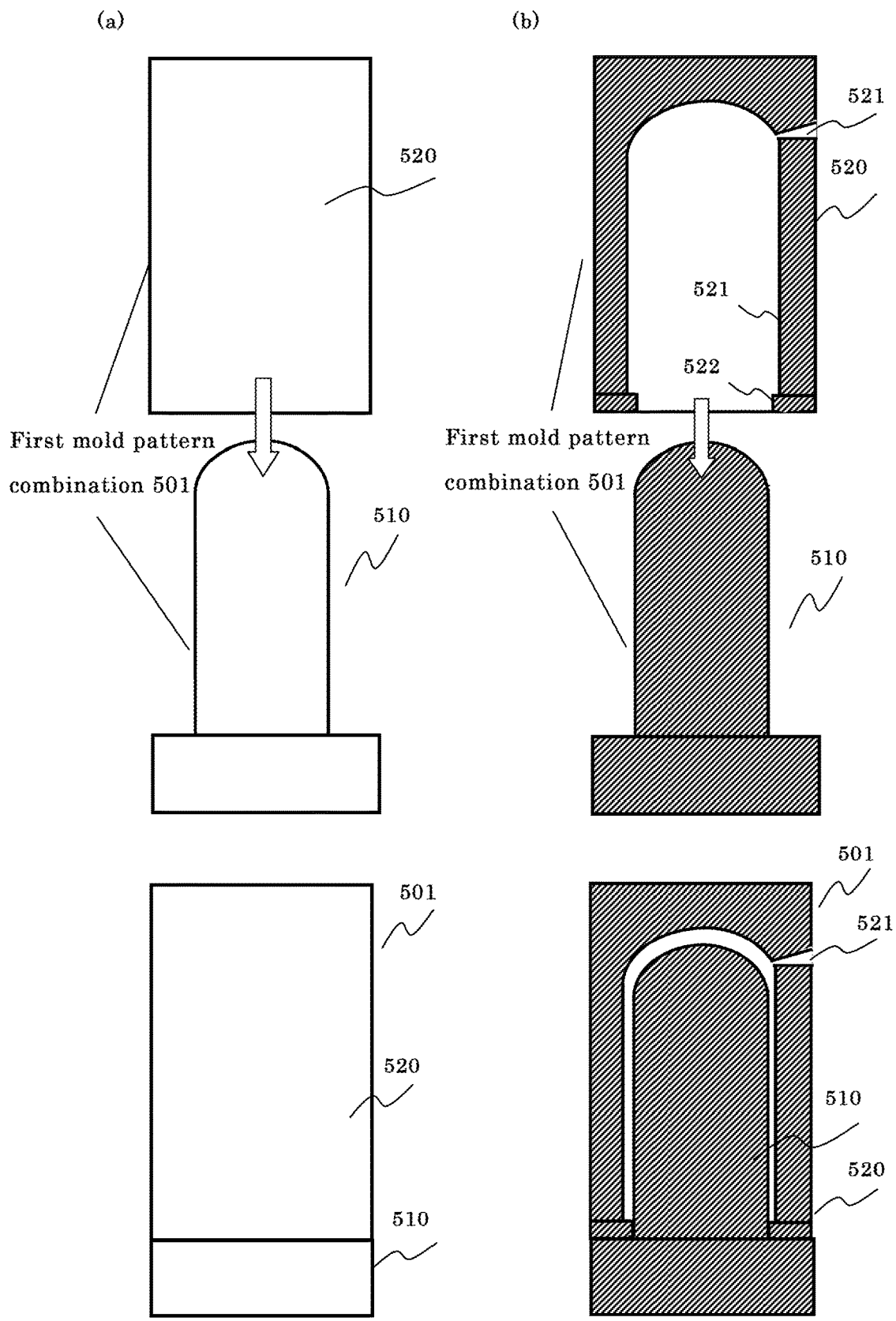
FIG. 11 (*a*) is a schematic view showing the first mold pattern combination 501 formed by combining the core mold of the inner mold 510 and the first cavity mold of the outer mold 520.

FIG. 11 is a schematic view showing the first mold pattern combination 501 formed by combining the core mold of the inner mold 510 and the first cavity mold of the outer mold 520.

FIG. 11 (a) shows a side view, and FIG. 11 (b) shows a vertical cross sectional view.

As shown in FIG. 11, the first mold pattern combination 501 is dynamically formed by combining the core mold of the inner mold 510 and the first cavity mold of the outer mold 520. The first mold injection space is formed in the first mold pattern combination 501. The first mold injection space is provided as the gap between the core mold of the inner mold 510 and the first cavity mold of the outer mold 520. This first mold injection space is connected to the gate 523. The mold injection can be operated by injecting the first material at high temperature and high pressure via the gate 523. There is a protrusion portion 521 in the inner surface of the cylinder shape, and the first mold injection space is narrowed by the protrusion portion 521 (the right hand of the first mold injection space becomes narrow in FIG. 11). Furthermore, there is a slide mold pattern 522 at the end of the opening of the cylinder shape, and the first mold injection space is not formed there.

Figure 12:
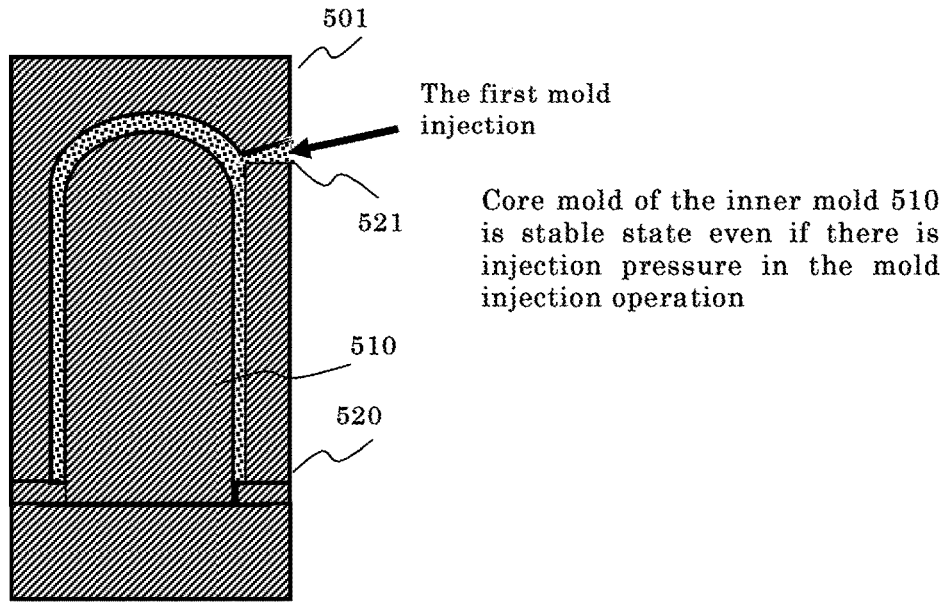
FIG. 12 (*a*) is a schematic view showing the molding injection to the first mold space in the first mold pattern combination 501.
Figure 12:
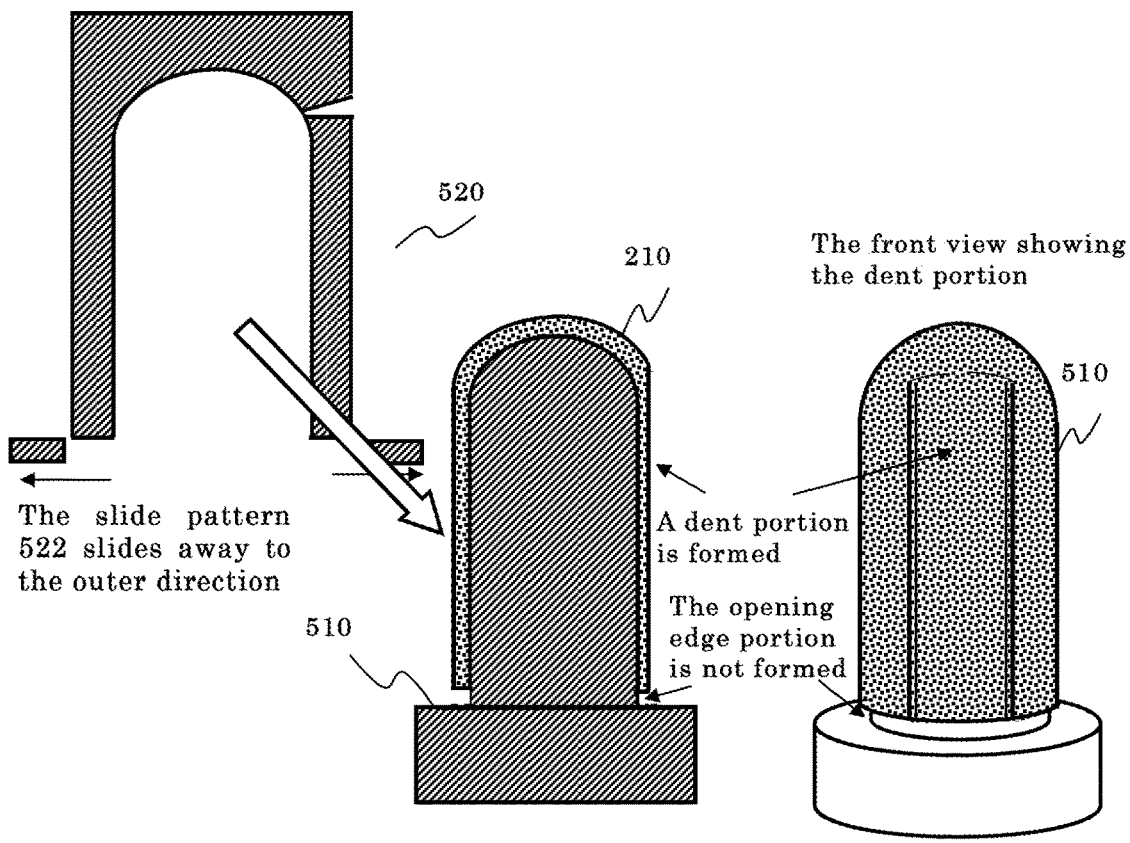

FIG. 12 is a schematic view showing the molding injection to the first mold space in the first mold pattern combination 501 and stripping the mold away from the molded production.

As shown in FIG. 12 (a), polypropylene melt at certain temperature is injected by certain pressure via the gate 523 to the first mold injection space in the first mold pattern combination 501. The first molded portion 210 is obtained by filling up the first mold injection space in the first mold pattern combination 501.

Next, as shown in FIG. 12 (b), after the first mold injection using by the first mold pattern combination 501, the slide pattern 522 slides away to the outer direction. When the core mold of the inner mold 510 is pulled out from the first cavity mold of the outer mold 520, the first molded portion 210 molded around the core mold of the inner mold 510 appears.

As shown in FIG. 12 (b), there is the protrusion portion 521 in the inner surface of the cylinder shape, the first molded portion 210 has a dent corresponding to the protrusion portion 521. Furthermore, there is the slide mold pattern 522 in the end of the opening of the cylinder shape, the first molded portion 210 is not formed corresponding to the slide mold pattern 522.

This is a process outline for the first mold injection step by using the first mold pattern combination 501 combining the core mold of the inner mold 510 and the first cavity mold of the outer mold 520.

(C) [The second mold injection process using the second mold pattern combination 502 which is a combination of the inner mold pattern 510 as a core and the outer mold pattern 530 as a second outer cavity]

Next, a process for the second mold injection step uses the second mold pattern combination 502 combining the core mold of the inner mold 510 and the second cavity mold of the outer mold 530.

Figure 13:
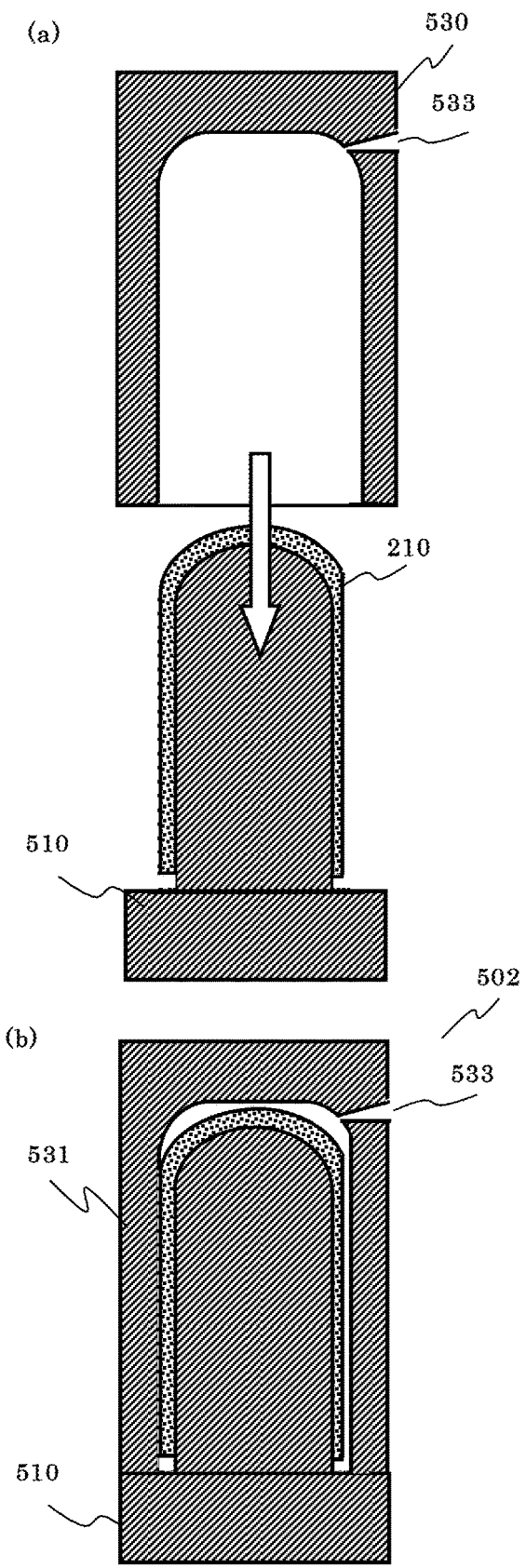
FIG. 13 (a) is a schematic view showing the second mold pattern combination 502 formed by combining the core mold of the inner mold 510 and the second cavity mold of the outer mold 530 (by half).

FIG. 13 is a schematic view showing the second mold pattern combination 502 formed by combining the core mold of the inner mold 510 and the second cavity mold of the outer mold 530.

FIG. 13 (a) shows a side view, and FIG. 13 (b) shows a vertical cross sectional view.

As shown in FIG. 13, the second mold pattern combination 502 is dynamically formed by combining the core mold of the inner mold 510 and the second cavity mold of the outer mold 530. The second mold injection space is formed in the second mold pattern combination 502. The second mold injection space is provided as the gap between the core mold of the inner mold 510 and the second cavity mold of the outer mold 530. This second mold injection space is connected to the gate 533. The mold injection can be operated by injecting the second material in high temperature and high pressure via the gate 533.

Figure 14:
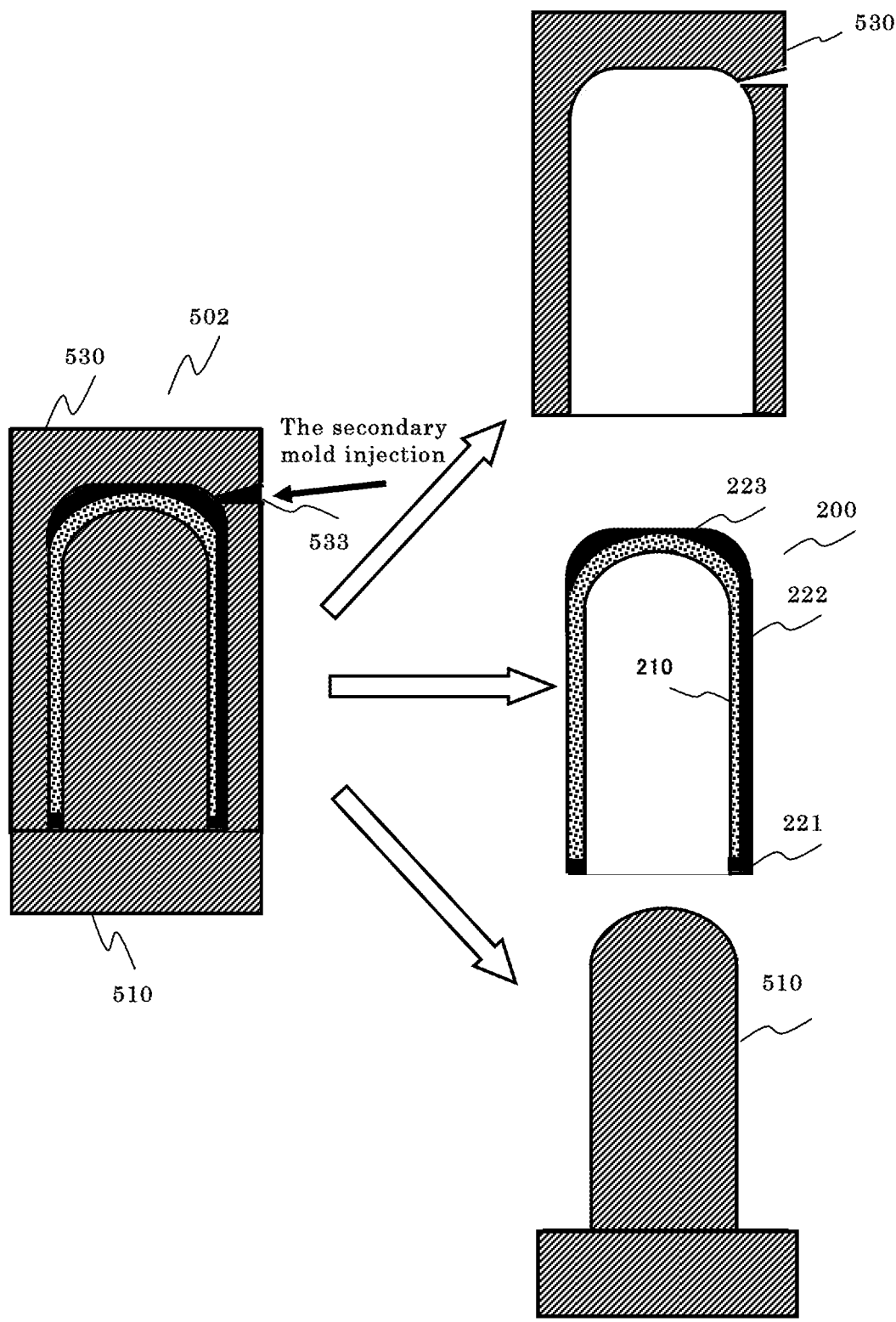
FIG. 14 is a schematic view showing the molding injection to the second mold space in the second mold pattern combination 502.

FIG. 14 is a schematic view showing the secondary molding injection to the second mold space in the second mold pattern combination 502.

As shown in left figure of FIG. 14, thermoplastic elastomer melt at a certain temperature is injected by a certain pressure via the gate 533 to the second mold injection space in the second mold pattern combination 502. The second molded portion 220 is obtained by filling up the second mold injection space in the second mold pattern combination 502. The tube body 200 is manufactured by molding the second molded portion 220 integrally onto the first molded portion 210.

When the core mold of the inner mold 510 is pulled out from the second cavity mold of the outer mold 530, the tube body 200 appears. This tube body 200 comprises the second molded portion including the opening edge portion 221, side surface portion 222 and the bottom surface portion 223 are formed onto the first molded portion 210.

Figure 15:
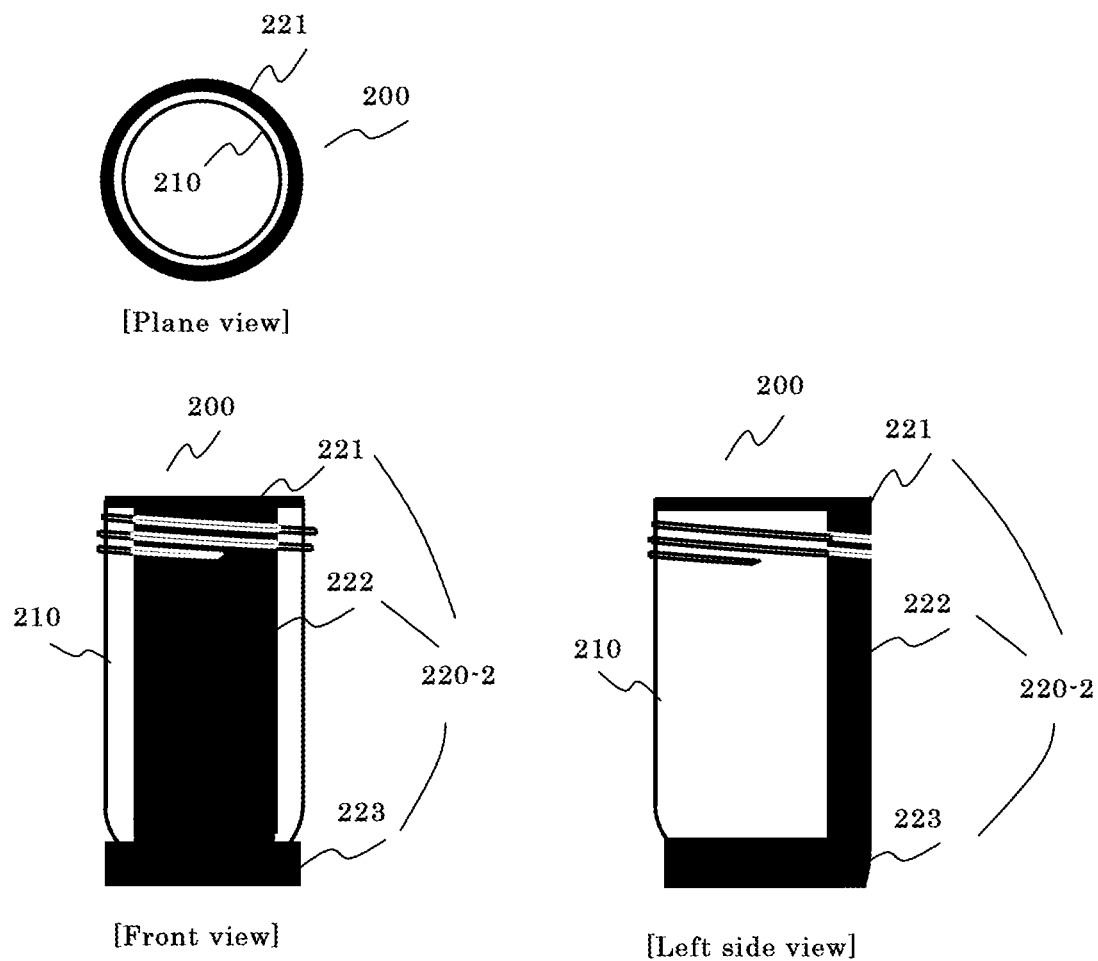
FIG. 15 is a schematic view showing stripping the mold away from the molded tube body 200 in which the outer screw is provided on the outer side surface.
Figure 16:
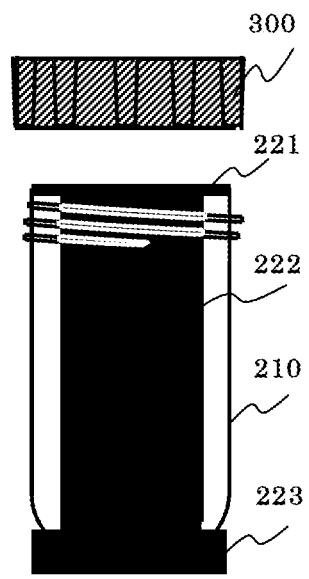
FIG. 16 (a) is a schematic view showing the molded tube body 200 capped by the lid 300 (blank).
Figure 16:
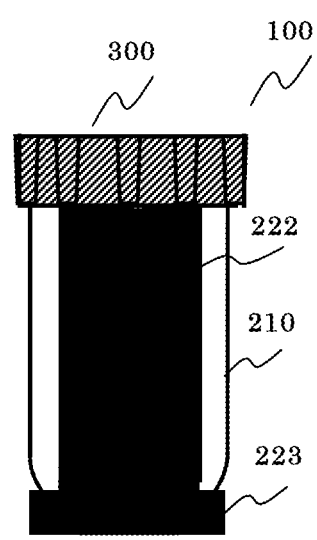
Figure 16:
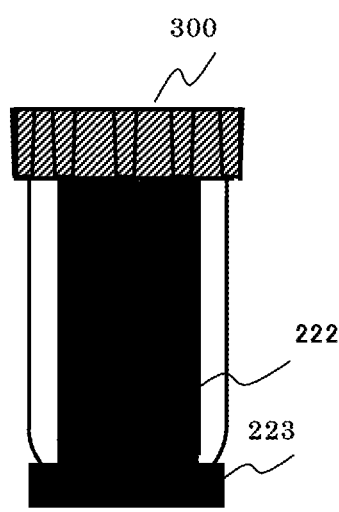
Figure 16:
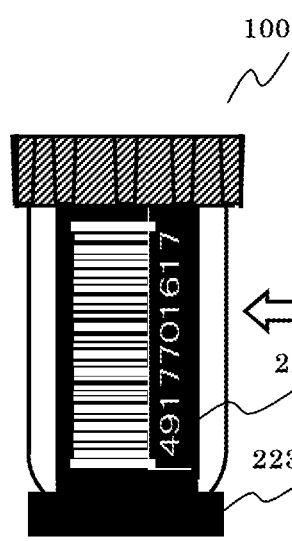
Figure 17:
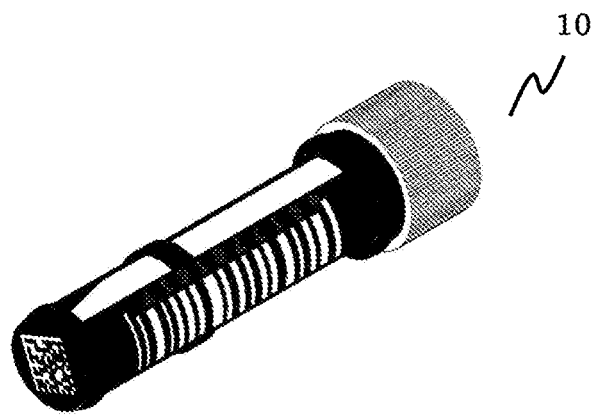
FIG. 17 (a) is a schematic view of the structure of an outer type micro tube in the prior art (assembled) shown in the JP4696186.
Figure 17:
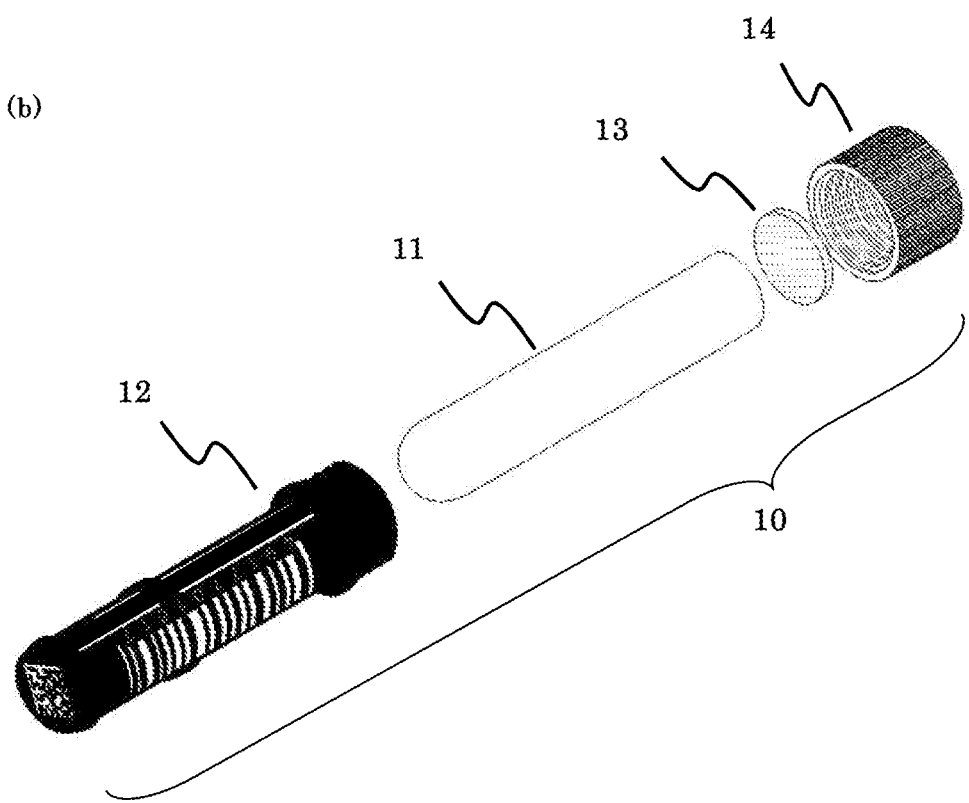
Figure 18:
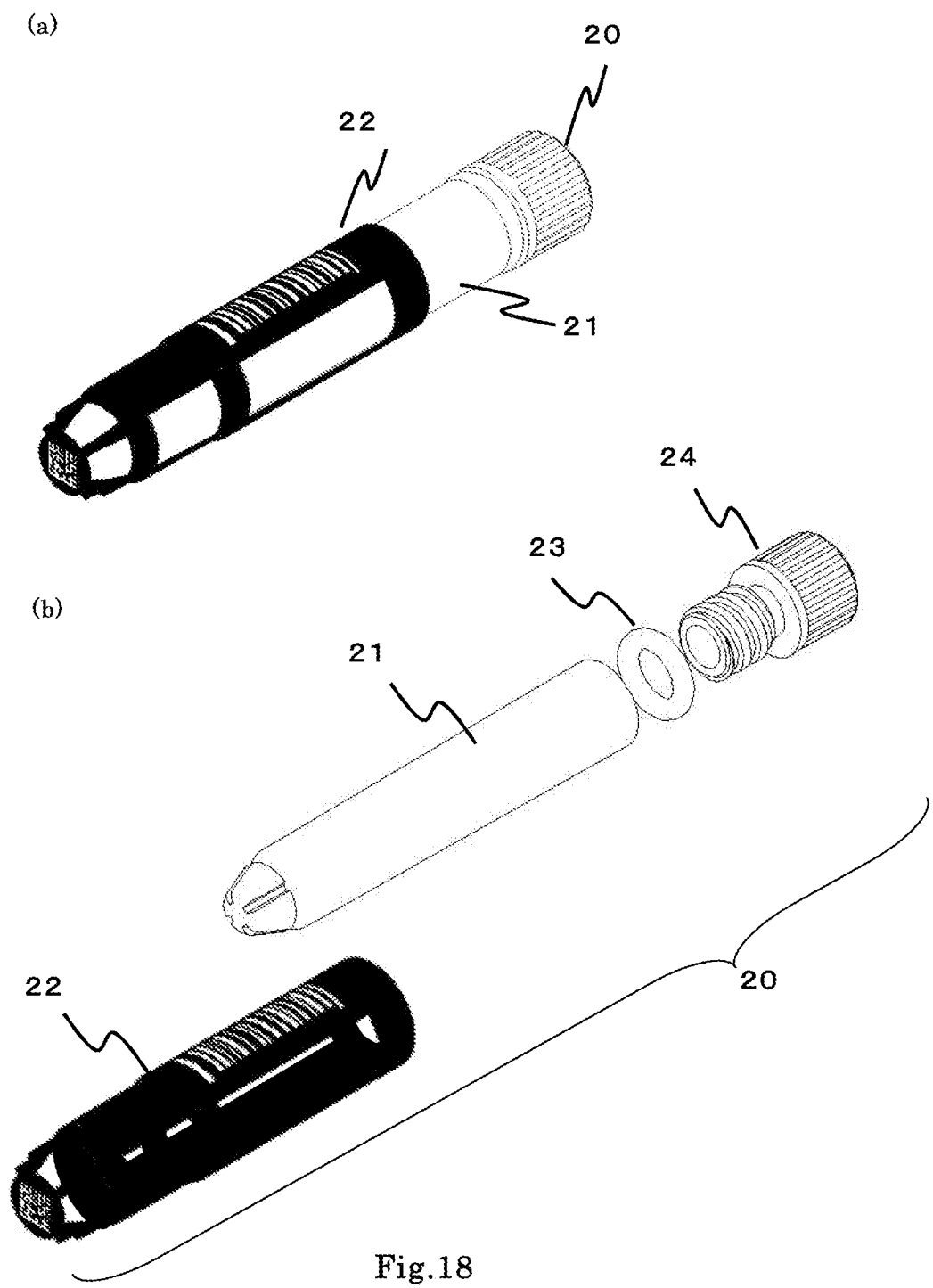
FIG. 18 (a) is a schematic view of the structure of an inner type micro tube in the prior art (assembled) shown in the JP4696186.

FIG. 15 is a schematic view showing the stripping the mold away from the molded tube body 200 and installing the outer screw to the outer side surface of the tube body 200. FIG. 16 is a schematic view showing the molded tube body 200 capped by the lid 300. As shown in FIG. 16, the lid 300 engages the opening of the tube body 200 by screwing.

The second material is an information writable material by laser marking, and as shown in FIG. 16 (b), identification code information for each sample storage tube 100-2 is written in the side surface portion 222 and the bottom surface portion 223 by laser marking.

While some preferable embodiments of the sample storage according to the present invention are described above, it should be understood that various changes are possible, without deviating from the technical scope according to the present invention. Therefore, the technical scope according to the present invention is limited only by the claims attached.

INDUSTRIAL APPLICABILITY

A sample storage tube according to the present invention can be employed as a sample storage tube such as a micro tube used extensively for storing a large number of samples with airtightness.

DESCRIPTION OF THE REFERENCE NUMERALS

100 Sample storage tube
200 Tube body
210 First molded portion
220 Second molded portion
300 Lid
501 First mold pattern combination
502 Second mold pattern combination
510 Core mold of the inner mold
520 First cavity mold of the outer mold
521 Protrusion portion
522 Slide mold pattern
523 Gate
530 Second cavity mold of the outer mold
533 Gate

The invention claimed is:

1. A sample storage tube for storing a sample, comprising:
a lid; and
a tube body configured to be closed by the lid, the tube body comprising:
a first molded portion being a continuous cylinder having a closed end and an open end, wherein the first molded portion has a sidewall with a first portion having a reduced thickness relative to that of a second portion, the first molded portion being made of a first material;
a second molded portion made of a second material different from the first material, the second molded portion comprising:
an annular portion integrally molded onto the open end of the first molded portion and configured to contact an inner surface of the lid;
a bottom portion integrally molded on an outer surface of the closed end of the first molded portion, the bottom portion includes a printable area to provide an information code of the sample storage tube; and
a side surface portion integrally molded in the first portion of the sidewall of the first molded portion, the side surface portion connecting the annular portion and the bottom portion,
wherein the annular portion, the bottom portion, and the side surface portion are one continuous body made of the second material that is integrally formed from the outer surface of the enclosed end of the first molded portion to the open end of the first molded portion,
wherein the second material has an elasticity to form an airtight seal, and the annular portion of the second molded portion is configured to seal the opening of the tube body and the inner surface of the lid.

2. The sample storage tube according to claim 1, wherein the first material is a plastic resin having a light transmissive ability;
the second material is a plastic resin having both a light transmissive ability and an ability to accept written information,
wherein the bottom portion of the tube body provides an information writable area.

3. The sample storage tube according to claim 1, wherein the first material is a plastic resin having a light transmissive ability;
the second material is a plastic resin having both a light transmissive ability and an ability to accept written information,
wherein the bottom portion of the tube body and the side surface of the tube body each provide an information writable area.

4. The sample storage tube according to claim 1, further comprising a connecting structure provided on either or both the first molded portion and a part of the side surface of the second molded portion.

5. The sample storage tube according to claim 4, wherein the connecting structure is provided as an inner screw type structure comprising an inner screw provided on an inner side surface wall around the opening of the tube body and an outer screw provided on an outer side surface wall of the lid;
wherein the inner side of the annular portion on the opening of the tube body has a bulge in an inward direction.

6. The sample storage tube according to claim 4, wherein the connecting structure is provided as an outer screw type structure comprising an outer screw provided on an outer side surface wall around the opening of the tube body and an inner screw provided on the inner surface of the lid; and wherein the outer side of the annular portion on the opening of the tube body has a bulge in an outward direction.

* * * * *